United States Patent
Yoneda et al.

(10) Patent No.: US 8,922,059 B2
(45) Date of Patent: Dec. 30, 2014

(54) POWER OPERATION SYSTEM, POWER OPERATION METHOD AND PHOTOVOLTAIC POWER GENERATOR

(75) Inventors: Tetsuya Yoneda, Osaka (JP); Takehito Mitate, Osaka (JP); Naoto Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1087 days.

(21) Appl. No.: 12/942,485

(22) Filed: Nov. 9, 2010

(65) Prior Publication Data

US 2011/0115292 A1    May 19, 2011

(30) Foreign Application Priority Data

Nov. 16, 2009    (JP) .................. 2009-260820

(51) Int. Cl.
*H02J 9/00*    (2006.01)
*H02J 3/38*    (2006.01)
*H02J 7/35*    (2006.01)

(52) U.S. Cl.
CPC .. *H02J 3/383* (2013.01); *H02J 7/35* (2013.01); *Y02B 10/14* (2013.01); *Y02E 10/563* (2013.01); *Y02E 10/566* (2013.01)
USPC ............................................. 307/66; 136/244

(58) Field of Classification Search
USPC ......... 307/38, 43, 44, 48, 64–66, 81–84, 141; 320/101; 323/906
See application file for complete search history.

(56) References Cited

U.S. PATENT DOCUMENTS

| | | | |
|---|---|---|---|
| 6,396,167 B1 * | 5/2002 | Simburger et al. ............. | 307/43 |
| 7,701,083 B2 * | 4/2010 | Savage ............................ | 307/29 |
| 7,783,390 B2 * | 8/2010 | Miller ............................ | 700/291 |
| 7,786,716 B2 * | 8/2010 | Simburger et al. ........... | 323/290 |
| 7,944,083 B2 * | 5/2011 | Fornage et al. ................. | 307/19 |
| 8,058,747 B2 * | 11/2011 | Avrutsky et al. ................ | 307/43 |
| 8,207,637 B2 * | 6/2012 | Marroquin et al. ........... | 307/147 |
| 8,321,064 B2 * | 11/2012 | Itoh et al. ...................... | 700/297 |
| 8,378,521 B2 * | 2/2013 | Rufer et al. ..................... | 307/51 |

(Continued)

FOREIGN PATENT DOCUMENTS

| | | |
|---|---|---|
| CN | 101924375 A | 12/2010 |
| JP | 2002152976 A2 | 5/2002 |

(Continued)

OTHER PUBLICATIONS

U.S. Appl. No. 12/796,925, Yoneda et al., filed Jun. 9, 2010.

*Primary Examiner* — Rexford Barnie
*Assistant Examiner* — Daniel Kessie
(74) *Attorney, Agent, or Firm* — Nixon & Vanderhye, P.C.

(57) ABSTRACT

Each of a plurality of photovoltaic power generators includes a solar cell, a storage battery, a communication interface for communication, and a battery control unit for controlling storage of electric power and output of electric power to an electric power system. The battery control unit of the first photovoltaic power generator included in the plurality of photovoltaic power generators causes the first photovoltaic power generator to prioritize output of the electric power to the electric power system over storage of the electric power during the first time period, and causes the second photovoltaic power generator included in the plurality of photovoltaic power generators to prioritize output of the electric power to the electric power system over storage of the electric power during the second time period delayed by a prescribed time period from the first time period, through the communication interface.

10 Claims, 12 Drawing Sheets

(56) References Cited

U.S. PATENT DOCUMENTS

| | | | |
|---|---|---|---|
| 2003/0047209 A1* | 3/2003 | Yanai et al. | 136/291 |
| 2004/0070280 A1 | 4/2004 | Nakata et al. | |
| 2005/0105224 A1* | 5/2005 | Nishi | 361/18 |
| 2007/0276547 A1* | 11/2007 | Miller | 700/295 |
| 2008/0238195 A1* | 10/2008 | Shaver et al. | 307/18 |
| 2009/0160259 A1* | 6/2009 | Naiknaware et al. | 307/82 |
| 2010/0313931 A1 | 12/2010 | Yoneda et al. | |

FOREIGN PATENT DOCUMENTS

| | | |
|---|---|---|
| JP | 2003-079054 | 3/2003 |
| JP | 2004135454 A2 | 4/2004 |
| JP | 2006180660 A2 | 7/2006 |
| JP | 2009268247 A2 | 11/2009 |
| JP | 2010288393 A2 | 12/2010 |

* cited by examiner

FIG.12

| SHIFT TIME PERIOD (MINUTE) / THRESHOLD VALUE(W) | 0 | 10 | 20 | 30 | 40 |
|---|---|---|---|---|---|
| 0 | 18800 | 18800 | 18800 | 15750 | 12080 |
| 100 | 18800 | 18800 | 18800 | 13730 | 10650 |
| 200 | 18800 | 18800 | 16340 | 11730 | 10650 |
| 300 | 18800 | 18800 | 16340 | 11730 | 10650 |
| 400 | 18800 | 18800 | 16340 | 11730 | 10650 |
| 500 | 18800 | 18800 | 14210 | 10000 | 9400 |
| 600 | 18800 | 18800 | 13730 | 9730 | 9000 |
| 700 | 18800 | 18800 | 12950 | 9210 | - |
| 800 | 18800 | 18800 | 11840 | 8230 | - |
| 900 | 18800 | 17040 | 11080 | 8880 | - |
| 1000 | 18800 | 16340 | 10360 | 8880 | - |

FIG.13

| SHIFT TIME PERIOD (MINUTE) / THRESHOLD VALUE(W) | 0 | 10 | 20 | 30 | 40 |
|---|---|---|---|---|---|
| 0 | 18800 | 18800 | 18800 | 18800 | 16288 |
| 100 | 18800 | 18800 | 18800 | 18800 | 15750 |
| 200 | 18800 | 18800 | 18800 | 18800 | 14910 |
| 300 | 18800 | 18800 | 18800 | 16340 | 13730 |
| 400 | 18800 | 18800 | 18800 | 16340 | 13730 |
| 500 | 18800 | 18800 | 18800 | 16340 | 11730 |
| 600 | 18800 | 18800 | 16340 | 11730 | 11730 |
| 700 | 18800 | 18800 | 14820 | 10000 | 11730 |
| 800 | 18800 | 18800 | 13730 | 9730 | 9000 |
| 900 | 18800 | 18800 | 12950 | 9210 | 9400 |
| 1000 | 18800 | 18800 | 11730 | 8220 | 10000 |

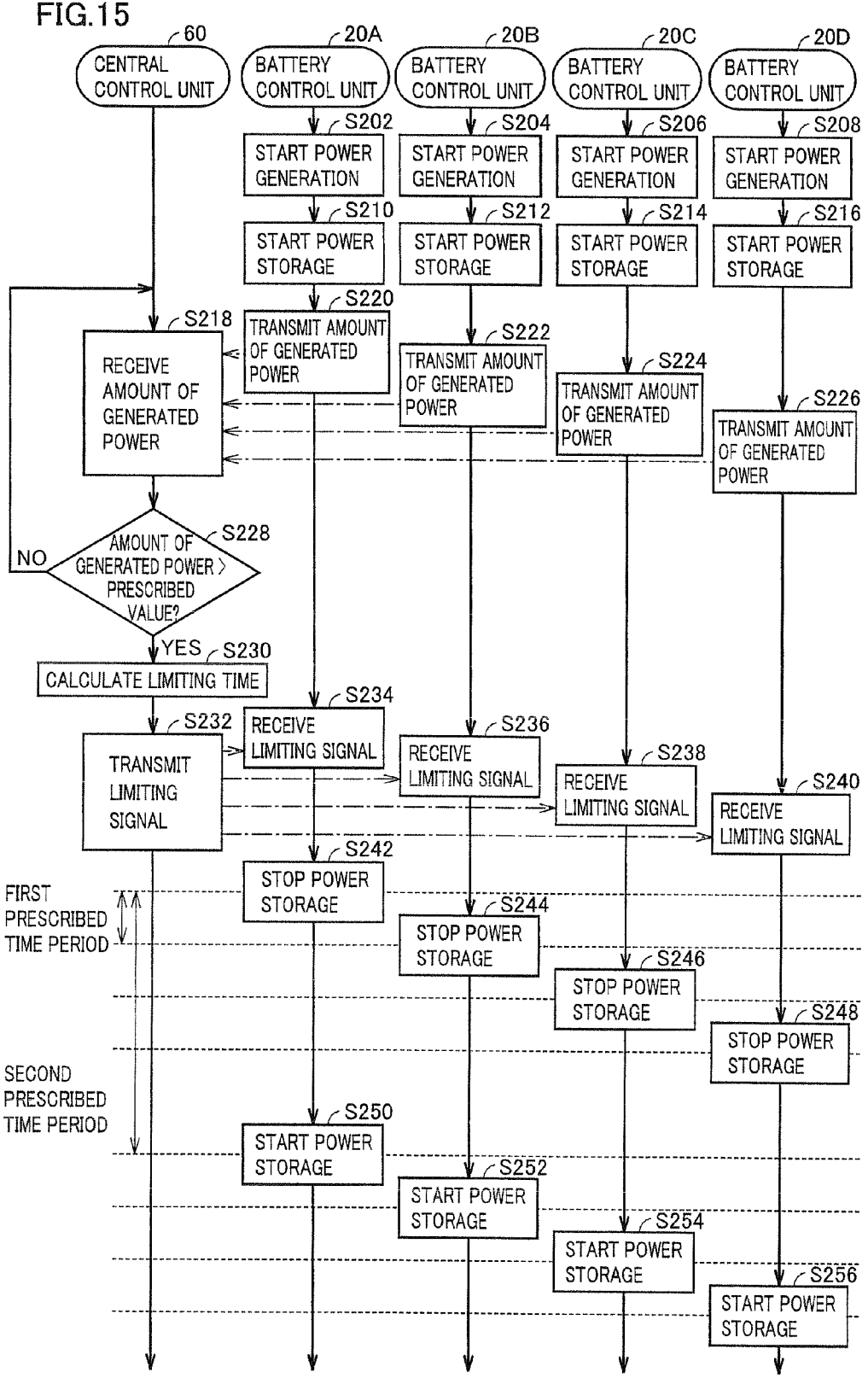

POWER OPERATION SYSTEM, POWER OPERATION METHOD AND PHOTOVOLTAIC POWER GENERATOR

This nonprovisional application is based on Japanese Patent Application No. 2009-260820 filed on Nov. 16, 2009 with the Japan Patent Office, the entire contents of which are hereby incorporated by reference.

BACKGROUND OF THE INVENTION

1. Field of the Invention

The present invention relates to a technique for operating a photovoltaic power generator including solar cells and a storage battery mounted on a house or the like and, more particularly, to a technique for operating a plurality of photovoltaic power generators capable of reverse power flow of electric power generated by the solar cells back to the electric power system.

2. Description of the Background Art

From the viewpoint of conserving the global environment, use of various energies has been reviewed. In particular, solar cells that utilize solar energy are considered promising as a representative source of clean energy. Recently, systems have been developed in which dispersed power sources on the side of solar cells and the commercial power supply on the side of the electric power system are linked, so that if necessary power consumed by a house cannot be fully provided by the solar cells, the shortage is offset by the commercial power supply on the side of the electric power system. Among such systems, some are adapted to realize reverse power flow, to feed excessive power output by solar cells back to the electric power system.

Further, a technique for storing excessive power output by solar cells in a storage battery and using the electric power of the storage battery if necessary power consumed by a house cannot be fully provided by the solar cells has been known. By way of example, Japanese Patent Laying-Open No. 2003-79054 discloses a solar power generation system having a storage battery. According to Japanese Patent Laying-Open No. 2003-79054, a solar power generation system, linked to an electric power system, supplies the power generated at a solar cell device to an inverter device for conversion to AC power and feeds it to a power consuming unit, and the system includes a storage battery for storing power from the solar cell device, and changeover control means for switching output of the power from the solar cell device to the storage battery or to the inverter device. The solar power generation system controls charging of the storage battery such that the battery is charged by at least one selected from the power generated by the solar cell device at a off-peak time of electric demand after sunrise and power from the electric power system at night, and controls discharging of the power stored in the storage battery in accordance with the change curve of electric demand, with the demand high in a specific time zone, so that the power from the battery is applied to the inverter device in addition to the power generated by the solar cell device.

When a plurality of photovoltaic power generators having storage batteries are connected to one receiving end of the electric power system, however, the following problem arises. Specifically, each photovoltaic power generator starts charging immediately after sunrise. Therefore, power is hardly sold through the receiving end of the electric power system in the morning. When the storage battery begins to be fully charged (FULL) in the afternoon based on the relationship between the amount of power generation and the amount of stored electric power of the solar cell, there may be a case where each photovoltaic power generator starts selling power almost concurrently through the receiving end of the electric power system.

Therefore, the amount of power sold through the receiving end of the electric power system in the morning is extremely small, while the amount of power sold through the receiving end of the electric power system in the afternoon becomes very large. In other words, the amount of electric power sold at the receiving end of the electric power system fluctuates considerably, so that the state of operation of the power operation system including a plurality of photovoltaic power generators connected to the receiving end of the electric power system becomes unstable. This leads to difficulties in maintaining the quality of the electric power, that is, suppressing voltage fluctuations and frequency fluctuations, for electric power companies managing the electric power system.

Even in the case where the electric power around the receiving end frequently becomes unstable, the electric power companies are responsible for maintaining the quality of the electric power, which causes a problem of an increase in the cost of the facility for maintaining the quality. Consequently, it is expected that electric power companies show reluctance to purchase the electric power. There is also a probability that the electric power companies may refuse to purchase the electric power in the areas and the circumstances where the widespread use of the solar cells is concentrated.

SUMMARY OF THE INVENTION

The present invention was made to solve such a problem, and its object is to reduce fluctuation in the amount of electric power sold to the electric power system by a plurality of photovoltaic power generators without relying on the power operation and the auxiliary facilities of the electric power companies.

According to an aspect, the present invention provides a power operation system including a plurality of photovoltaic power generators connected to an electric power system through one same receiving end. Each of the plurality of photovoltaic power generators includes a solar cell receiving sunlight and outputting electric power, a storage battery for storing the electric power, a communication interface for communication with another photovoltaic power generator, and a battery control unit for controlling storage of the electric power and output of the electric power to the electric power system. The battery control unit of a first photovoltaic power generator included in the plurality of photovoltaic power generators causes the first photovoltaic power generator to prioritize output of the electric power to the electric power system over storage of the electric power during a first time period, and causes a second photovoltaic power generator included in the plurality of photovoltaic power generators to prioritize output of the electric power to the electric power system over storage of the electric power during a second time period delayed by a prescribed time period from the first time period, through the communication interface.

Preferably, the first photovoltaic power generator further includes a detecting unit detecting an output value of electric power from the solar cell. The battery control unit of the first photovoltaic power generator determines whether or not the output value reached a prescribed value, using the detecting unit, and determines the first and second time periods based on a time point when the output value reached the prescribed value.

Preferably, the first photovoltaic power generator further includes a detecting unit detecting an output value of electric power from the solar cell. The battery control unit of the first photovoltaic power generator determines whether or not the solar cell output electric power, using the detecting unit, and determines the first and second time periods based on a time point when the solar cell started to output the electric power.

According to another aspect, the present invention provides a power operation system including a plurality of photovoltaic power generators connected to an electric power system through one same receiving end. Each of the plurality of photovoltaic power generators includes a solar cell receiving sunlight and outputting electric power, a storage battery for storing the electric power, and a battery control unit for controlling storage of the electric power and output of the electric power to the electric power system. The power operation system further includes a central control unit for causing a first photovoltaic power generator included in the plurality of photovoltaic power generators to prioritize output of the electric power to the electric power system over storage of the electric power during a first time period, and causing a second photovoltaic power generator included in the plurality of photovoltaic power generators to prioritize output of the electric power to the electric power system over storage of the electric power during a second time period delayed by a prescribed time period from the first time period.

According to another aspect, the present invention provides a power operation system including a plurality of photovoltaic power generators connected to an electric power system through one same receiving end. Each of the plurality of photovoltaic power generators includes a solar cell receiving sunlight and outputting electric power, a storage battery for storing the electric power, a communication interface for communication with another photovoltaic power generator, and a battery control unit for controlling storage of the electric power and output of the electric power to the electric power system. The battery control unit of a first photovoltaic power generator included in the plurality of photovoltaic power generators causes the first photovoltaic power generator to prioritize output of the electric power to the electric power system over storage of the electric power during a first time period. The battery control unit of a second photovoltaic power generator included in the plurality of photovoltaic power generators causes the second photovoltaic power generator to prioritize output of the electric power to the electric power system over storage of the electric power during a second time period delayed by a prescribed time period from the first time period.

According to another aspect, the present invention provides a power operation method using a plurality of photovoltaic power generators connected to an electric power system through one same receiving end. Each of the plurality of photovoltaic power generators includes a solar cell receiving sunlight and outputting electric power, a storage battery for storing the electric power, a communication interface for communication with another photovoltaic power generator, and a battery control unit for controlling storage of the electric power and output of the electric power to the electric power system. The power operation method includes the steps of the battery control unit of a first photovoltaic power generator included in the plurality of photovoltaic power generators causing the first photovoltaic power generator to prioritize output of the electric power to the electric power system over storage of the electric power during a first time period, and causing a second photovoltaic power generator included in the plurality of photovoltaic power generators to prioritize output of the electric power to the electric power system over storage of the electric power during a second time period delayed by a prescribed time period from the first time period, through the communication interface.

According to another aspect, the present invention provides a power operation method using a plurality of photovoltaic power generators connected to an electric power system through one same receiving end, and a central control unit. Each of the plurality of photovoltaic power generators includes a solar cell receiving sunlight and outputting electric power, a storage battery for storing the electric power, and a battery control unit for controlling storage of the electric power and output of the electric power to the electric power system. The power operation method includes the steps of the central control unit causing a first photovoltaic power generator included in the plurality of photovoltaic power generators to prioritize output of the electric power to the electric power system over storage of the electric power during a first time period, and the central control unit causing a second photovoltaic power generator included in the plurality of photovoltaic power generators to prioritize output of the electric power to the electric power system over storage of the electric power during a second time period delayed by a prescribed time period from the first time period.

According to another aspect, the present invention provides a power operation method using a plurality of photovoltaic power generators connected to an electric power system through one same receiving end. Each of the plurality of photovoltaic power generators includes a solar cell receiving sunlight and outputting electric power, a storage battery for storing the electric power, and a battery control unit for controlling storage of the electric power and output of the electric power to the electric power system. The power operation method includes the steps of the battery control unit of a first photovoltaic power generator included in the plurality of photovoltaic power generators causing the first photovoltaic power generator to prioritize output of the electric power to the electric power system over storage of the electric power during a first time period, and the battery control unit of a second photovoltaic power generator included in the plurality of photovoltaic power generators causing the second photovoltaic power generator to prioritize output of the electric power to the electric power system over storage of the electric power during a second time period delayed by a prescribed time period from the first time period.

According to another aspect, the present invention provides a photovoltaic power generator including a solar cell receiving sunlight and outputting electric power, a storage battery for storing the electric power, a communication interface for communication with another photovoltaic power generator connected to an electric power system through one same receiving end, and a battery control unit for controlling storage of the electric power and output of the electric power to the electric power system. The battery control unit causes the photovoltaic power generator to prioritize output of the electric power to the electric power system over storage of the electric power during a first time period, and causes at least one said another photovoltaic power generator to prioritize output of the electric power to the electric power system over storage of the electric power during a second time period delayed by a prescribed time period from the first time period, through the communication interface.

As described above, according to the present invention, a power operation system and a power operation method reducing fluctuation in the amount of electric power sold by a plurality of photovoltaic power generators to the electric power system, can be provided.

The foregoing and other objects, features, aspects and advantages of the present invention will become more appar-

BRIEF DESCRIPTION OF THE DRAWINGS

FIG. 12 is a list of the maximum values of the electric power sold for each combination of the threshold value and the shift time period in the case where the threshold value and the output value from a power conditioner are compared with each other.

FIG. 13 is a list of the maximum values of the electric power sold for each combination of the threshold value and the shift time period in the case where the threshold value and the output value from a solar cell are compared with each other.

FIG. 15 shows control sequence by each battery control unit in the power operation system in accordance with the second embodiment.

DESCRIPTION OF THE PREFERRED EMBODIMENTS

Figure 1:
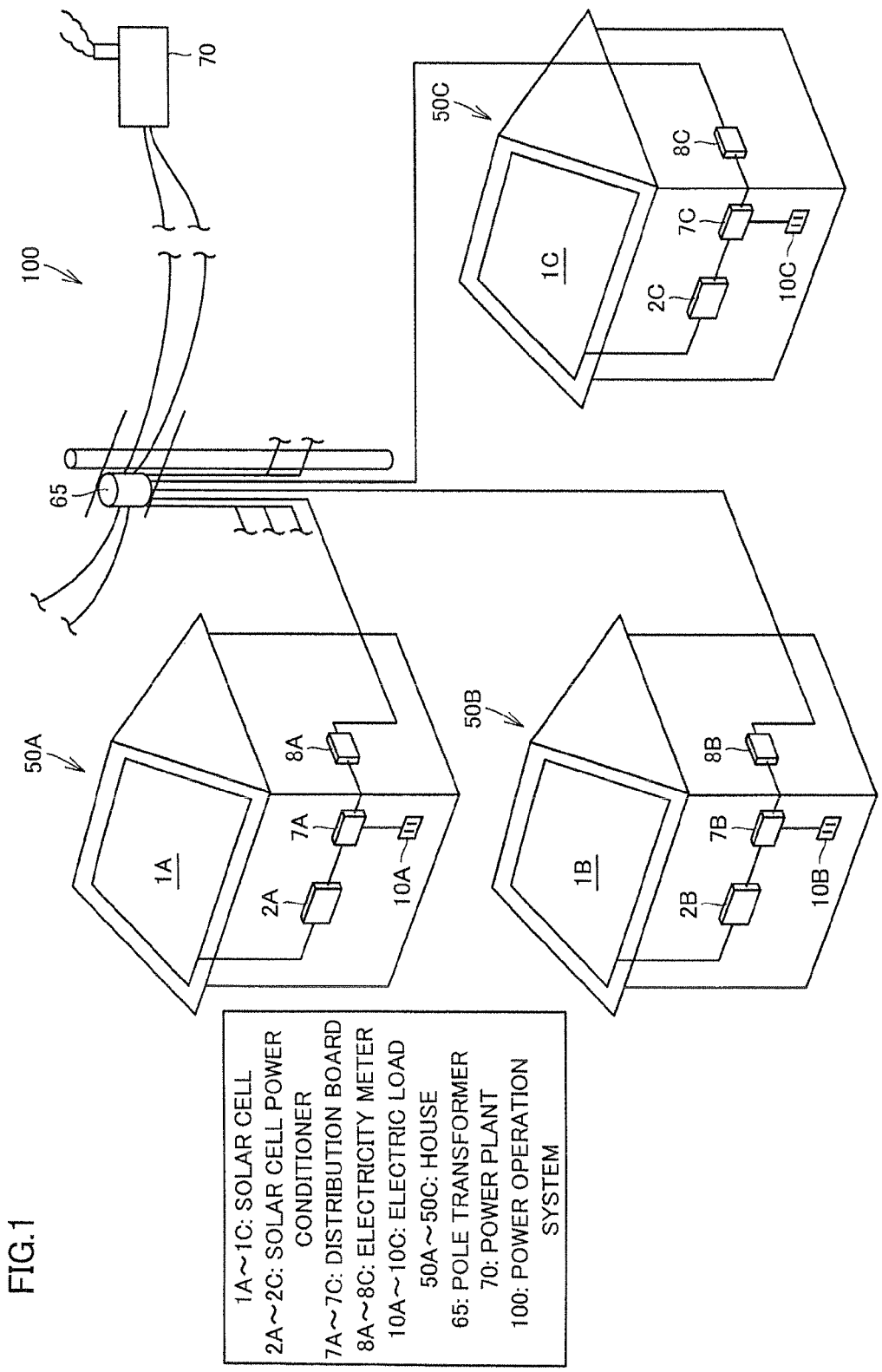
FIG. 1 is an illustration showing an overall configuration of the power operation system in accordance with the present embodiment.

In the following, embodiments of the present invention will be described. In the following description, the same components are denoted by the same reference characters. Their names and functions are also the same. Therefore, detailed description thereof will not be repeated.

[First Embodiment]

<Schematic Configuration of Power Operation System 100>

First, referring to FIG. 1, the schematic configuration of a power operation system 100 in accordance with the present embodiment will be described. FIG. 1 is an illustration showing an overall configuration of power operation system 100 in accordance with the present embodiment.

It is to be noted that the photovoltaic power generator can be installed, for example, in a house provided with every home appliance designed to use electricity for operation (a house systematically designed and constructed so as to be supplied with hot water not by gas but by electricity). For example, currently in Japan, each house is generally under contract to be supplied with an electric current of 60 amperes to 100 amperes. The applicable range of a pole transformer 65 as an example of the receiving end is usually from 50 KVA to 100 KVA. Accordingly, in the present embedment, it is assumed that the number of photovoltaic power generators (40A, 40B and 40C) connected to one pole transformer 65 is eight. However, the number of photovoltaic power generators included in power operation system 100 is not limited to eight.

In the following, all time including those shown in the figures is represented in 24 hours system. Furthermore, for the purpose of explanation of the hardware configuration and the like, the description will be made using the figure in which photovoltaic power generators for three houses are connected to the receiving end of the electric power system. In other words, FIG. 1 shows photovoltaic power generators for three houses, and also shows only the leading lines from pole transformer 65 for the remaining photovoltaic power generators.

When the number of houses to be controlled (the number of photovoltaic power generators) is small, it is less likely to cause a problem that the amount of electric power sold fluctuates. In contrast, an increased number of houses to be controlled causes an increase in the number of houses in which the charge limiting time is significantly shifted behind as described below. This tends to cause more houses that are not sufficiently charged. However, there is an increased need for suppressing fluctuations in the electric power at the receiving end of the electric power system, which may lead to a significant effect.

Referring to FIG. 1, power operation system 100 includes, for houses 50A, 50B, and 50C, solar cells 1A, 1B and 1C, solar cell power conditioners 2A, 2B and 2C, distribution boards 7A, 7B and 7C, electricity meters 8A, 8B and 8C, and electric loads 10A, 10B and 10C, respectively. Power operation system 100 further includes a pole transformer or a transformer (hereinafter both are generally referred to as a pole transformer 65 (receiving end of the electric power system)) for supplying power from a power plant 70 to houses 50A, 50B and 50C. Pole transformer 65 is electrically connected to distribution boards 7A, 7B and 7C, supplies power from the electric power system to distribution boards 7A, 7B and 7C of houses 50A, 50B and 50C, and supplies power from solar cells 1A, 1B and 1C to the electric power system.

In power operation system 100 in accordance with the present embodiment, in houses 50A, 50B and 50C, power generated by solar cells 1A, 1B and 1C is used by loads 10A, 10B and 10C, respectively. If solar cells 1A, 1B and 1C cannot provide sufficient power necessary for loads 10A, 10B and 10C, houses 50A, 50B and 50C buy power from pole transformer 65 (electric power purchase). If solar cells 1A, 1B and 1C generate power larger than required by loads 10A, 10B and 10C, houses 50A, 50B and 50C supply power to pole transformer 65 (electric power sales). In the following, electric power purchase refers to obtaining power from the electric power system through pole transformer 65 to each house, and electric power sales refers to feeding power from each house through pole transformer 65 to the electric power system.

Figure 5:
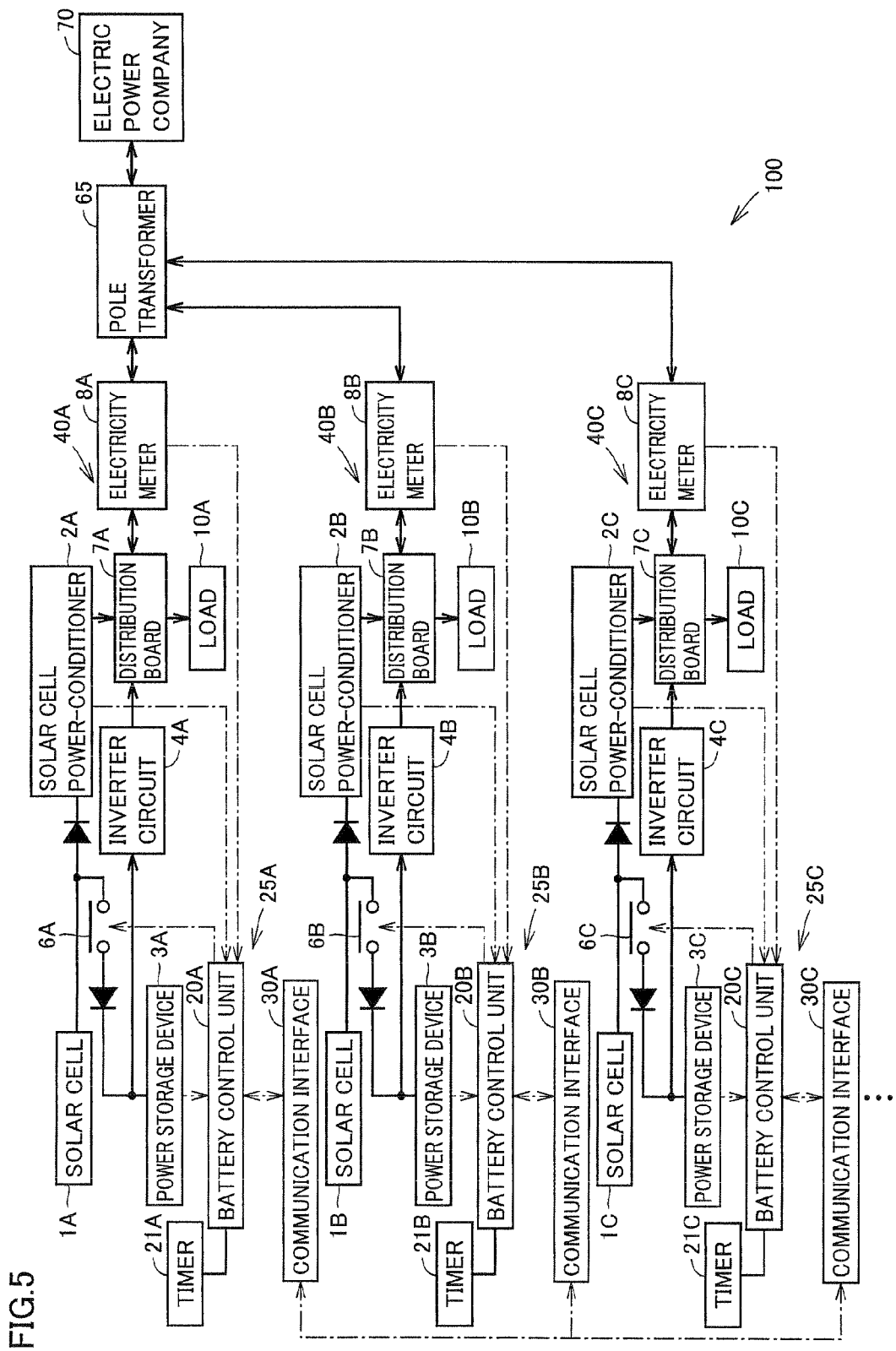
FIG. 5 is a block diagram showing hardware configuration of the power operation system in accordance with the first embodiment.

Further, in power operation system 100 in accordance with the present embodiment, each of houses 50A, 50B and 50C has a power storage device (see FIG. 5). If solar cells 1A, 1B and 1C generate power larger than required by loads 10A, 10B and 10C, excessive power is stored in the power storage device. If solar cells 1A, 1B and 1C cannot provide power necessary for loads 10A, 10B and 10C, loads 10A, 10B and 10C also use power from the power storage device. If solar cells 1A, 1B and 1C generate power larger than required by loads 10A, 10B and 10C with the power storage device fall, houses 50A, 50B and 50C supply power to pole transformer 65 (electric power sales).

<Characteristics of Power Operation System without Power Storage Device>

Figure 2:
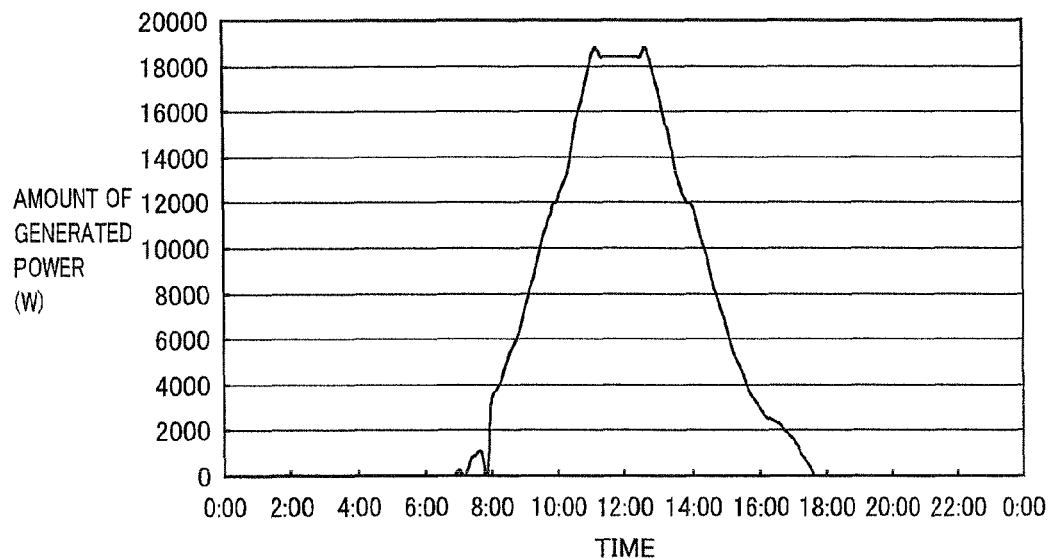
FIG. 2 is a graph showing a change in the amount of power sold through a pole transformer when each house does not have any power storage device.

As a reference, an example in which houses 50A, 50B and 50C do not have any power storage device will be described. FIG. 2 is a graph showing a change in the amount of power sold through pole transformer 65 when each of houses 50A, 50B and 50C does not have any power storage device.

In the following, an example in which photovoltaic power generators for eight houses are connected to pole transformer 65 will be described. It is to be noted that, in order to show the details of transition of the electric power, the change in the amount of photovoltaic power generation for each ten minutes and the change in the amount of power consumption in each house are studied with reference to FIGS. 4, 8, 12, and 13. Particularly, the study has been conducted assuming that the power consuming patterns of all of eight houses are the same and the power generation patterns of the solar cells are also the same. Specifically, in the case of families where both parents work, children do not stay in the house during the daytime since they go to school, which results in less power consumption. Thus, it is assumed in the following description that houses achieving the greatest amount of electric power sales around noon are concentrated in one area.

If no approach is taken in the above-described conditions, the eight houses exhibit identical fluctuations in the amounts of electric power sales. This allows the situation to occur in which the greatest difference exists between the amount of electric power sold in pole transformer 65 during nighttime and the amount of electric power sold in pole transformer 65 at about 13:00, which is a suitable example for examining whether effects can be achieved or not.

Referring to FIG. 2, the amount of electric power sold through pole transformer 65 starts to increase from sunrise, and peaks at around 11:00 to 13:00. Specifically, a significant difference exists between the amount of electric power sales through pole transformer 65 at night (basically zero) and the amount of electric power sales through pole transformer 65 around 11:00 to 13:00. In other words, there is a considerable change in the amount of electric power sales by a plurality of photovoltaic power generators.

<Characteristics of Power Operation System with Power Storage Device>

Figure 3:
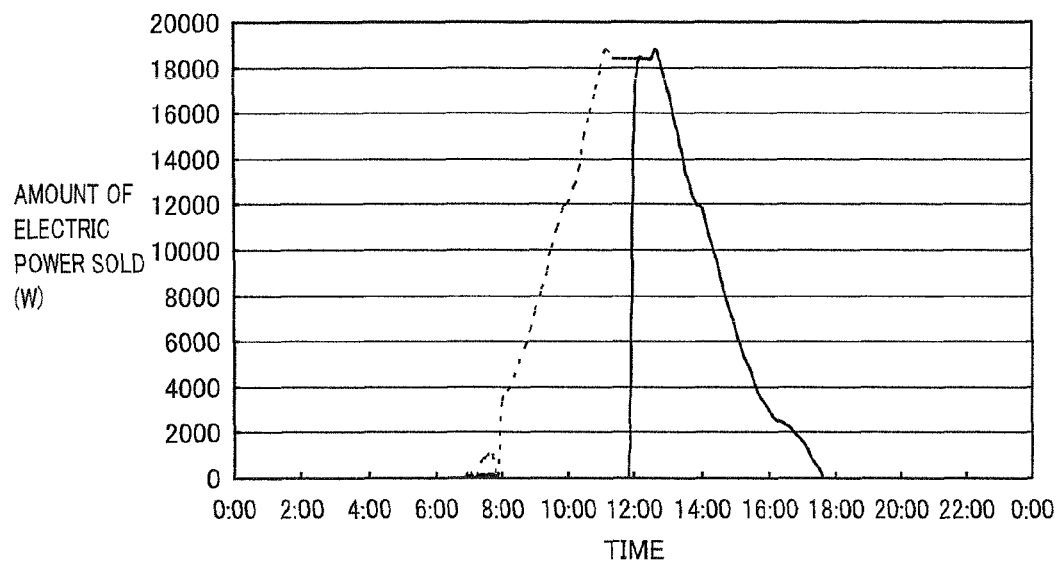
FIG. 3 is a graph showing a change in the amount of power sold through a pole transformer when each house has a power storage device.

Next, as a reference, an example in which houses 50A, 50B and 50C have power storage devices will be described. FIG. 3 is a graph showing a change in the amount of power sold through pole transformer 65 when each of houses 50A, 50B and 50C has a power storage device. In FIG. 3, the change in the amount of power sold through pole transformer 65 when each of houses 50A, 50B and 50C does not have any power storage device is plotted in a dotted line.

Referring to FIG. 3, the amount of electric power sold through pole transformer 65 starts to increase at around noon, and peaks at around 13:00. The reason for this is that from sunrise, the power storage device starts accumulating power generated by the solar cells and since the power is charged in the power storage device, the amount of electric power sales does not increase in the morning. When the power storage device is fully charged at around noon, the amount of electric power sales increases thereafter, in the similar manner as shown in FIG. 2. Specifically, the amount of electric power sales through pole transformer 65 at night (basically zero) and the amount of electric power sales through pole transformer 65 around 13:00 is significantly different. In other words, there is a considerable change in the amount of electric power sales by a plurality of photovoltaic power generators.

<Characteristics of Power Operation System in Accordance with Present Embodiment>

In order to solve the above-described problem, power operation system 100 in accordance with the present embodiment delays, by 30 minutes (shift time period), the time when the power storage devices are fully charged for each of houses 50A, 50B and 50C. In other words, in power operation system 100 in accordance with the present embodiment, the time of electric power sales is delayed by 30 minutes in each of houses 50A, 50B and 50C.

It is more preferable to connect the power storage device mounted on a vehicle such as a hybrid vehicle and an electric vehicle to the above-described power storage device in parallel, to increase the apparent power storage capacity for storing the solar cell electric power which is originally supposed to be allocated to electric power sales in the case where the vehicle-mounted power storage device is not mounted in parallel, thereby lowering the peak value of the electric power sales.

More specifically, power operation system 100 in accordance with the present embodiment limits storage of electric power in different time periods, in each of houses 50A, 50B and 50C. In other words, in power operation system 100 in accordance with the present embodiment, electric power sales is given priority at different time periods for each of houses 50A, 50B and 50C.

Figure 4:
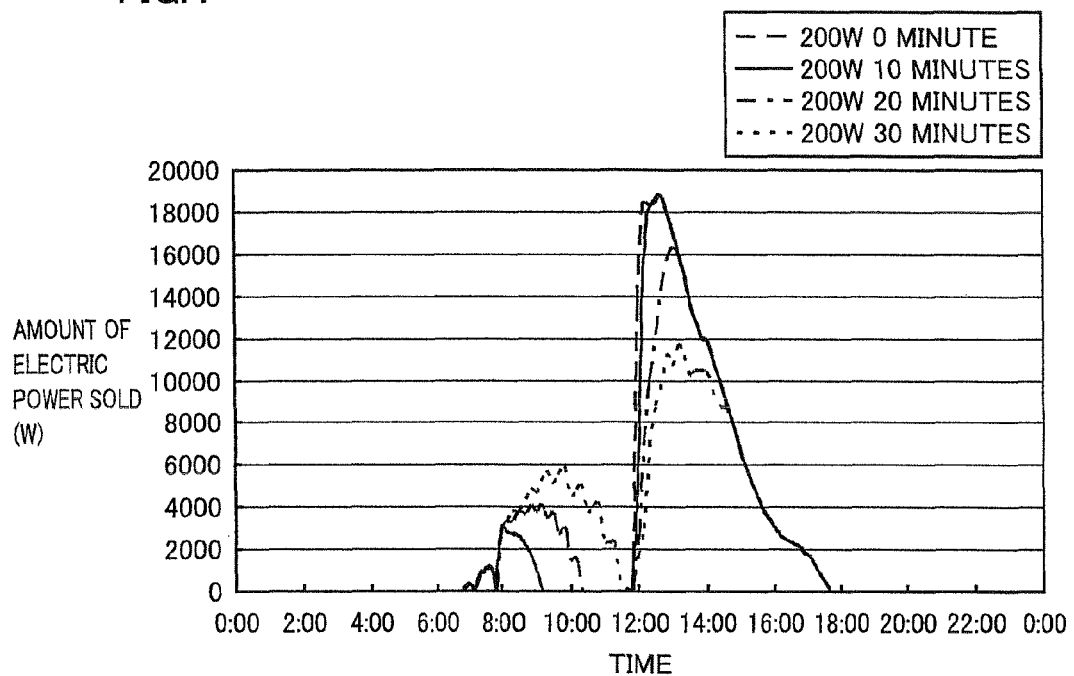
FIG. 4 is a graph showing a change in the amount of electric power sales with respect to each shift time period in the case where the threshold value used for starting to limit power storage in accordance with the present embodiment is assumed to be 200 W.

FIG. 4 is a graph showing a change in the amount of electric power sales with respect to each shift time period in the case where the threshold value used for starting to limit power storage in accordance with the present embodiment is assumed to be 200 W. More specifically, FIG. 4 shows the change in the amount of electric power sales in the case where there is no shift in the time period during which power storage is inhibited in each of photovoltaic power generators 40A, 40B and 40C; the change in the amount of electric power sales in the case where the time period during which power storage is inhibited in each of photovoltaic power generators 40A, 40B and 40C is shifted by 10 minutes; the change in the amount of electric power sales in the case where the time period during which power storage is inhibited in each of photovoltaic power generators 40A, 40B and 40C is shifted by 20 minutes; and the change in the amount of electric power sales in the case where the time period during which power storage is inhibited in each of photovoltaic power generators 40A, 40B and 40C is shifted by 30 minutes.

Referring to FIG. 4, according to the present embodiment, the time period in which power storage is limited, that is, the time period during which electric power sales is given priority, is different house by house. Therefore, the peak of electric power sales becomes lower than the case shown in FIGS. 2 and 3. Specifically, in power operation system 100 in accordance with the present embodiment, it is possible to reduce the difference between the amount of electric power sales at pole transformer 65 at night (basically zero) and the amount of electric power sales at pole transformer 65 at around 13:00. In other words, by power operation system 100 in accordance with the present embodiment, the change in the amount of electric power sales by the plurality of photovoltaic power generators can be reduced.

Particularly, when the threshold value is 200 W, a significant effect can be achieved by the shift time period between 20 minutes and 30 minutes.

Furthermore, since the power operation system according to the present embodiment can be accommodated as a mechanism for time-shifting the charging start time only by introducing control software, detecting means and means for limiting the flow of the electric power, the power operation system is useful in terms of cost-effectiveness as compared with the cost required for taking measures to improve the quality of electric power on the electric power system side.

In the following, the configuration for realizing such a function will be described.

<Hardware Configuration of Power Operation System 100>

Next, a specific configuration of power operation system 100 in accordance with the present embodiment will be described. FIG. 5 is a block diagram showing hardware configuration of power operation system 100 in accordance with the present embodiment. In FIG. 5, the flow of electric energy (electric power) is represented by solid arrows, and the flow of information (signals) such as numerical values and instructions is represented by dotted arrows.

Referring to FIG. 5, power operation system 100 includes, for houses 50A, 50B and 50C, photovoltaic power generators 40A, 40B and 40C, including solar cells 1A, 1B and 1C, power conditioners 2A, 2B and 2C, power storage devices 3A, 3B and 3C and inverter circuits 4A, 4B and 4C, respectively. Power operation system 100 further includes, for houses 50A, 50B and 50C, distribution boards 7A, 7B and 7C, electricity meters 8A, 8B and 8C, electric loads 10A, 10B and 10C, battery control units 20A, 20B and 20C, timers 21A, 21B and 21C, and communication interfaces 30A, 30B and 30C, respectively.

In the present embodiment, photovoltaic power generators 40A, 40B and 40C include battery controllers 25A, 25B and 25C, respectively. Battery controllers 25A, 25B and 25C include battery control units 20A, 20B and 20C, timers 21A, 21B and 21C, and communication interfaces 30A, 30B and 30C, respectively.

Solar cells 1A, 1B and 1C use solar energy, and convert solar energy to electric energy. Solar cells 1A, 1B and 1C are connected to power conditioners 2A, 2B and 2C of a system coordination type.

Power conditioners 2A, 2B and 2C convert DC power input from solar cells 1A, 1B and 1C to AC power for output. Power conditioners 2A, 2B and 2C in accordance with the present embodiment are connected to distribution boards 7A, 7B and 7C.

In the present embodiment, power conditioners 2A, 2B and 2C detect, as detecting units, output values of electric power (amount of power generation) generated by solar cells 1A, 1B and 1C and transmit the output values to battery control units 20A, 20B and 20C, respectively. In the following, the signal transmitted from the detecting units to battery control units 20A, 20B and 20C will be referred to as a power generation signal. It is noted, however, that solar cells 1A, 1B and 1C or battery control units 20A, 20B and 20C (if provided with a detecting unit as one of their functions) or other device may serve as detecting units to directly detect the output values of electric power generated by solar cells 1A, 1B and 1C, and battery control units 20A, 20B and 20C may use the thus provided output values. As will be described later, battery control units 20A, 20B and 20C determine whether or not solar cells 1A, 1B and 1C are generating power, based on the output values of solar cells 1A, 1B and 1C.

Alternatively, power conditioners 2A, 2B and 2C serving as detecting units, solar cells 1A, 1B and 1C or other device may determine whether or not solar cells 1A, 1B and 1C are generating power, based on the power output values. In that case, information representing whether or not solar cells 1A, 1B and 1C are generating power (or information representing that solar cells 1A, 1B and 1C are generating power) is transmitted periodically to battery control units 20A, 20B and 20C.

It is noted that power conditioners 2A, 2B and 2C, solar cells 1A, 1B and 1C, battery control units 20A, 20B and 20C or other device can obtain at least one of output voltage (V), output current (A) and output power (W) at opposite ends of solar cells 1A, 1B and 1C as the output value of solar cells 1A, 1B and 1C. By way of example, power conditioners 2A, 2B and 2C, battery control units 20A, 20B and 20C or other device may obtain, as alternatives to the output values of solar cells 1A, 1B and 1C, the output power (W) at opposite ends of solar cells 1A, 1B and 1C minus the power (W) consumed by photovoltaic power generators 40A, 40B and 40C by themselves. In other words, the output of the power conditioner may be utilized, as the output to be detected, in place of the output of the solar cell.

Power storage devices 3A, 3B and 3C store electric power input from solar cells 1A, 1B and 1C. Power storage devices 3A, 3B and 3C are connected to switches 6A, 6B and 6C and to input terminals of inverter circuits 4A, 4B and 4C. A common lead storage battery or a device storing energy using flywheel may be used as power storage devices 3A, 3B and 3C. Further, not only a single storage battery but also a plurality of storage batteries connected to each other may be used as power storage devices 3A, 3B and 3C.

Output terminals of inverter circuits 4A, 4B and 4C are connected to distribution boards 7A, 7B and 7C. Inverter circuits 4A, 4B and 4C have a function for linkage to the electric power system. Inverter circuits 4A, 4B and 4C convert DC power input from power storage devices 3A, 3B and 3C to AC power and supply to loads 10A, 10B and 10C.

Distribution boards 7A, 7B and 7C are connected to power conditioners 2A, 2B and 2C and inverter circuits 4A, 4B and 4C. Distribution boards 7A, 7B and 7C are connected through electricity meters 8A, 8B and 8C to pole transformer 65 on the side of electric power system. Distribution boards 7A, 7B and 7C supply electric power from power conditioners 2A, 2B and 2C and inverter circuits 4A, 4B and 4C through loads 10A, 10B and 10C and pole transformer 65 to the electric power system. Distribution boards 7A, 7B and 7C supply electric power from the electric power system through pole transformer 65 to loads 10A, 10B and 10C.

Switches 6A, 6B and 6C are connected to solar cells 1A, 1B and 1C and power storage devices 3A, 3B and 3C. Switches 6A, 6B and 6C turn ON/OFF connections between solar cells 1A, 1B and 1C and power storage devices 3A, 3B and 3C, based on limiting signals from battery control units 20A, 20B and 20C.

Battery control units 20A, 20B and 20C are implemented, for example, by a CPU (Central Processing Unit) and a control program executed by the CPU. More specifically, the CPU reads a control program stored in a memory which is not shown, and executes the control program, thereby implementing battery control units 20A, 20B and 20C.

Battery control units 20A, 20B and 20C control switching of switches 6A, 6B and 6C, based on a limiting signal which will be described later, the amount of electric power stored in power storage devices 3A, 3B and 3C, and the amount of electric power at distribution boards 7A, 7B and 7C and electricity meters 8A, 8B and 8C. Battery control units 20A, 20B and 20C transmit/receive data to/from other battery control units 20A, 20B and 20C through communication interfaces 30A, 30B and 30C. By way of example, battery control unit 20A transmits the limiting signal to other battery control units 20B and 20C through communication interfaces 30A, 30B and 30C.

Battery control units 20A, 20B and 20C in accordance with the present embodiment limits power storage in a prescribed time period with reference to timers 21A, 21B and 21C. By way of example, battery control units 20B and 20C in accordance with the present embodiment turn OFF switches 6B and 6C for a prescribed time period based on a limiting signal from battery control unit 20A.

In the present embodiment, each of battery control units 20A, 20B and 20C or each of communication interfaces 30A, 30B and 30C is assigned an ID (address). Each of battery control units 20A, 20B and 20C transmits a signal (data) based on the ID of the destination.

<Outline of Operation of Power Operation System 100>

Figure 6:
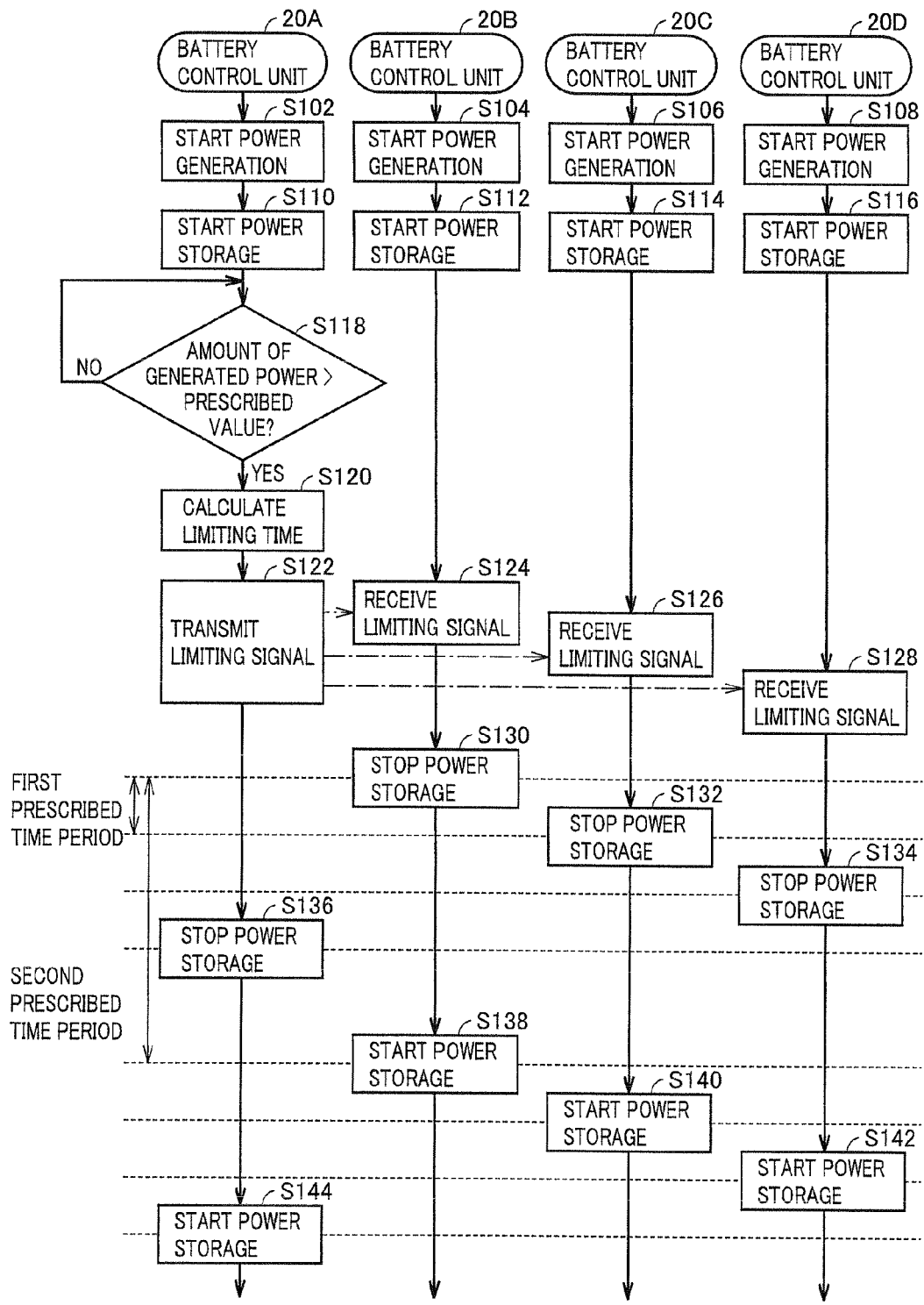
FIG. 6 shows control sequence by each battery control unit in the power operation system in accordance with the first embodiment.

Next, the outline of the operation of power operation system 100 in accordance with the present embodiment will be described. FIG. 6 shows control sequence by battery control units 20A, 20B, 20C and 20D in power operation system 100 in accordance with the present embodiment.

Referring to FIG. 6, solar cell 1A of photovoltaic power generator 40A (first photovoltaic power generator) of house 50A (first house) starts power generation (step S102). Solar cell 1B of photovoltaic power generator 40B (second photovoltaic power generator) of house 50B (second house) starts power generation (step S104). Solar cell 1C of photovoltaic power generator 40C (third photovoltaic power generator) of house 50C (third house) starts power generation (step S106). The solar cell of a photovoltaic power generator (fourth photovoltaic power generator) of a house (fourth house) starts power generation (step S108).

Battery control unit 20A turns ON switch 6A, so as to start charging power storage device 3A with the excessive power (step S110). More specifically, battery control unit 20A starts to store the excessive power not used by load 10A in power storage device 3A, based on a signal from distribution board 7A or a signal from electricity meter 8A.

In the present embodiment, battery control unit 20A detects based on the power generation signal from power conditioner 2A that power storage device 3A started power storage. In other words, the following operation is started at the time, as a starting point, when the amount of power generated by solar cell 1A exceeds the power consumed by the photovoltaic power generator such as power conditioner 2A and the excessive power exceeds a predetermined value.

Battery control unit 20B turns ON switch 6B, to start charging of power storage device 3B with the excessive power (step S112). Battery control unit 20B detects the start of power storage. Battery control unit 20C turns ON switch 6C, to start charging of power storage device 3C with the excessive power (step S114). Battery control unit 20C detects the start of power storage. Battery control unit 20D turns ON a switch, to start charging of a power storage device with the excessive power (step S116). Battery control unit 20D detects the start of power storage.

Battery control unit 20A determines whether or not the amount of power generated by solar cell 1A (output value) exceeded a prescribed value (step S118). If the amount of power generated by solar cell 1A does not exceed the prescribed value (NO at step S118), battery control unit 20A repeats the process steps from step S118.

Battery control unit 20A may directly detect the amount of power generated by solar cell 1A and also may refer to power conditioner 2A as detecting means. Furthermore, battery control unit 20A may receive the amount of power generated by the first to fourth photovoltaic power generators through communication interface 30A, to determine whether or not the amount of power generated by any one of the first to fourth photovoltaic power generators exceeded the prescribed value. Alternatively, battery control unit 20A may receive the amounts of power generated by the first to fourth photovoltaic power generators through communication interface 30A and may determine whether or not the total amount of power generated by the first to fourth photovoltaic power generators exceeded a prescribed value.

When battery control unit 20A determines that the amount of power generation exceeded the prescribed value (threshold value) (YES at step S118), based on the time point when the amount of power generation exceeded the prescribed value, battery control unit 20A calculates a power storage limiting time period in which power storage is limited in each photovoltaic power generator (step S120).

The power storage limiting time period in each photovoltaic power generator corresponds to the time period during which electric power sales is given priority over power storage in the photovoltaic power generator. It is to be noted that the length of the power storage limiting time period may be set in advance based on the number of photovoltaic power generators connected to pole transformer 65 or may be reset every day based on the time point at which the amount of power generation exceeds the prescribed value and on the number of photovoltaic power generators.

For example, battery control unit 20A determines, as a power storage limiting time period of the first photovoltaic power generator, the prescribed time period from the time point at which the amount of power generation exceeded the threshold value. Battery control unit 20A determines, as a power storage limiting time period of the second photovoltaic power generator, the prescribed time period from the time point after a prescribed shift time period has passed from the time point at which the amount of power generation exceeded a threshold value. Battery control unit 20A determines, as a power storage limiting time period of the third photovoltaic power generator, the prescribed time period from the time point after twice the prescribed shift time period has passed from the time point at which the amount of power generation exceeded a threshold value. Battery control unit 20A determines, as a power storage limiting time period of the fourth photovoltaic power generator, the prescribed time period from the time point after three times the prescribed shift time period has passed from the time point at which the amount of power generation exceeded a threshold value.

Battery control unit 20A transmits the power storage limiting time period for limiting power storage to battery control units 20B, 20C and 20D, using communication interface 30A (step S122). Battery control unit 20A issues a signal to other battery control units 20B, 20C and 20D in a smaller unit of time (10-minute intervals), and each of these battery control units 20B, 20C and 20D limits power storage based on the signal.

More specifically, battery control unit 20A transmits the time point (for example, started 20 minutes later, 40 minutes later and the like) at which limitation of power storage should be started in respective battery control units 20B, 20C and 20D, to battery control units 20B, 20C and 20D, based on the present time point. Alternatively, battery control unit 20A may transmit the time length (for example, 1 hour, 2 hours) in which power storage should be limited in respective battery control units 20B, 20C and 20D, to battery control units 20B, 20C and 20D, when the time point comes from which battery control units 20B, 20C and 20D should start limiting power storage.

Battery control unit 20B receives the limiting signal from battery control unit 20A through communication interface 30B (step S124). Battery control unit 20C receives the limiting signal from battery control unit 20A through communication interface 30C (step S126). Battery control unit 20D receives the limiting signal from battery control unit 20A through a communication interface (step S128).

Based on the received limiting signal, battery control unit 20B turns off switch 6B, whereby power storage is stopped for the prescribed time period, and electric power sales is given priority (step S130). At this time, battery control unit 20C maintains switch 6C ON and stores power with priority for the prescribed shift time period, based on the limiting signal. Battery control unit 20D maintains the switch ON for twice the prescribed shift time period, and stores power with priority, based on the limiting signal.

When the prescribed shift time period passes, battery control unit 20C turns OFF switch 6C, to stop power storage for the prescribed time period and sell power with priority (step S132). Then, the prescribed shift time period further passes, battery control unit 20D turns OFF the switch, to stop power storage for the prescribed time period and sell power with priority (step S134). Then, the prescribed shift time period further passes, battery control unit 20A turns OFF switch 6A, to stop power storage for the prescribed time period and sell power with priority (step S136).

When the power storage limiting time period from step S130 ends, battery control unit 20B turns ON switch 6B, to start power storage (step S138). When the prescribed shift time period from step S132 further passes, battery control unit 20C turns ON switch 6C, to start power storage (step S140). When the prescribed shift time period from step S134 further passes, battery control unit 20D turns ON the switch, to start power storage (step S142). When the prescribed shift time period from step S136 further passes, battery control unit 20A turns ON switch 6A, to start power storage (step S144).

Figure 7:
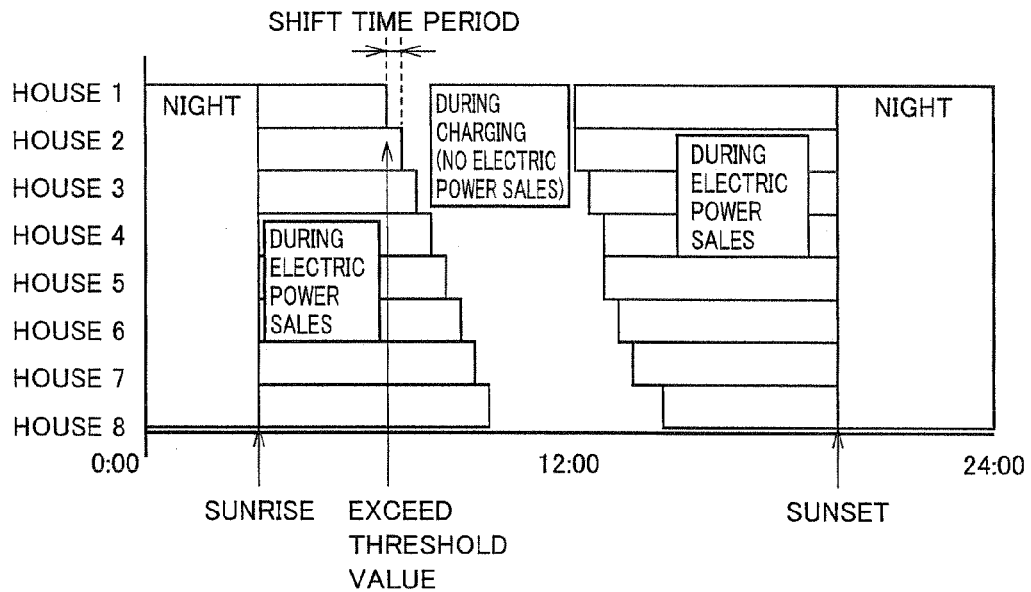
FIG. 7 is an illustration showing the relationship between the time period during which electric power sales is given priority and the time period during which power storage is given priority in each house.

FIG. 7 is an illustration showing the relationship between the time period during which electric power sales is given priority and the time period during which power storage is given priority in each house. As shown in FIG. 7, in power operation system 100 in accordance with the present embodiment, battery control unit 20A limits power storage in each of photovoltaic power generators 40A, 40B and 40C for a prescribed time period, which causes a shift between the time period during which electric power sales is given priority and the time period during which power storage is given priority in each house.

Therefore, power storage devices 3A, 3B and 3C of photovoltaic power generators 40A, 40B and 40C are fully charged at different timings. Consequently, in power operation system 100 in accordance with the present embodiment, it is possible to prevent photovoltaic power generators 40A, 40B and 40C from starting electric power sales at one time. Thus, the change in the amount of electric power sales at pole transformer 65 can be reduced.

The configuration for reducing complexity of control will then be hereinafter described. The longer the shift time period is, the greater the suppressing amount of fluctuation in the amount of electric power sales in pole transformer 65 is achieved. However, since an excessively long shift time period may lead to inefficient charging, it is not preferable that the shift time period is set excessively long. In contrast, an excessively short shift time period may lead to reduced suppressing amount of fluctuation in the amount of electric power sales. In view of the foregoing, the threshold value of the amount of power generation and the shift time period should be set so as to increase the suppressing amount of fluctuation in the amount of electric power sales and also to decrease the possibility of insufficient charging.

<Study Results 1>

The results of the study on combination of the threshold value of the amount of power generation and the shift time period will be hereinafter described.

Figure 8:
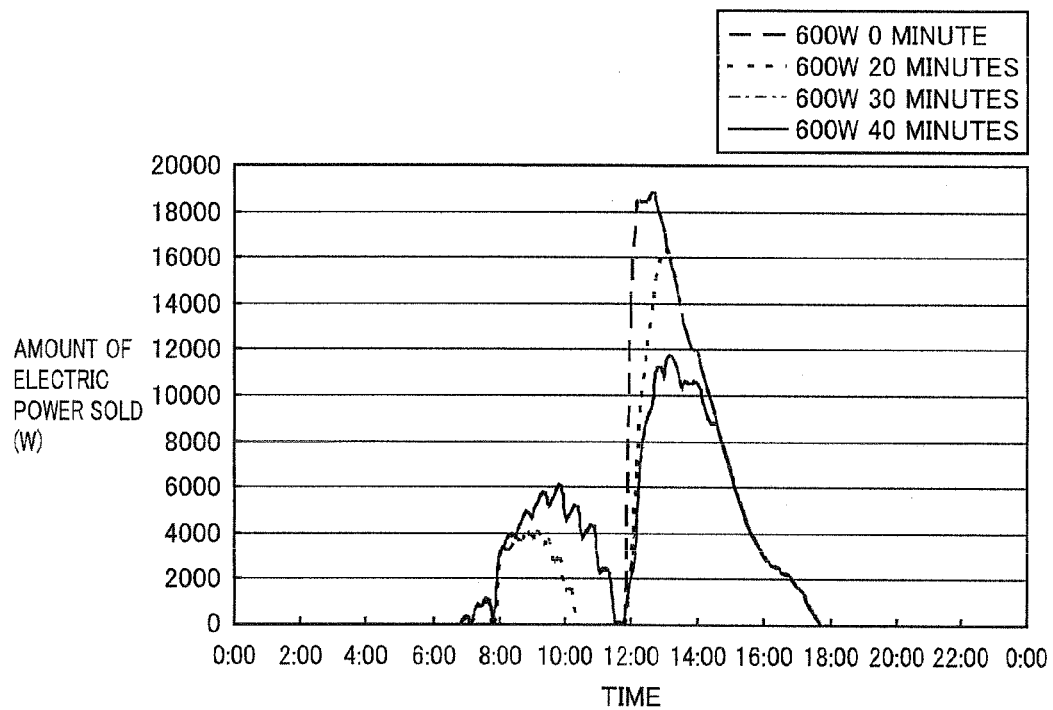
FIG. 8 is a graph showing a change in the amount of electric power sales with respect to each shift time period in the case where the threshold value used for starting to limit power storage in accordance with the present embodiment is assumed to be 600 W.

FIG. 8 is a graph showing a change in the amount of electric power sales with respect to each shift time period in the case where the threshold value used for starting to limit power storage in accordance with the present embodiment is assumed to be 600 W. More specifically, FIG. 8 shows the change in the amount of electric power sales in the case where there is no shift in the time period during which power storage is inhibited in each of photovoltaic power generators 40A, 40B and 40C; the change in the amount of electric power sales in the case where the time period during which power storage is inhibited in each of photovoltaic power generators 40A, 40B and 40C is shifted by 20 minutes; the change in the amount of electric power sales in the case where the time period during which power storage is inhibited in each of photovoltaic power generators 40A, 40B and 40C is shifted by 30 minutes; and the change in the amount of electric power sales in the case where the time period during which power storage is inhibited in each of photovoltaic power generators 40A, 40B and 40C is shifted by 40 minutes.

Referring to FIG. 8, according to the present embodiment, the time period in which power storage is limited, that is, the time period during which electric power sales is given priority, is different house by house. Therefore, the peak of electric power sales becomes lower than the case shown in FIGS. 2 and 3. Specifically, in power operation system 100 in accordance with the present embodiment, it is possible to reduce the difference between the amount of electric power sales at pole transformer 65 at night (basically zero) and the amount of electric power sales at pole transformer 65 at around 13:00. In other words, by power operation system 100 in accordance with the present embodiment, the change in the amount of electric power sales by the plurality of photovoltaic power generators can be reduced.

Particularly, when the threshold value is 600 W, a significant effect can be achieved by the shift time period between 20 minutes and 40 minutes.

<Study Results 2>

Figure 9:
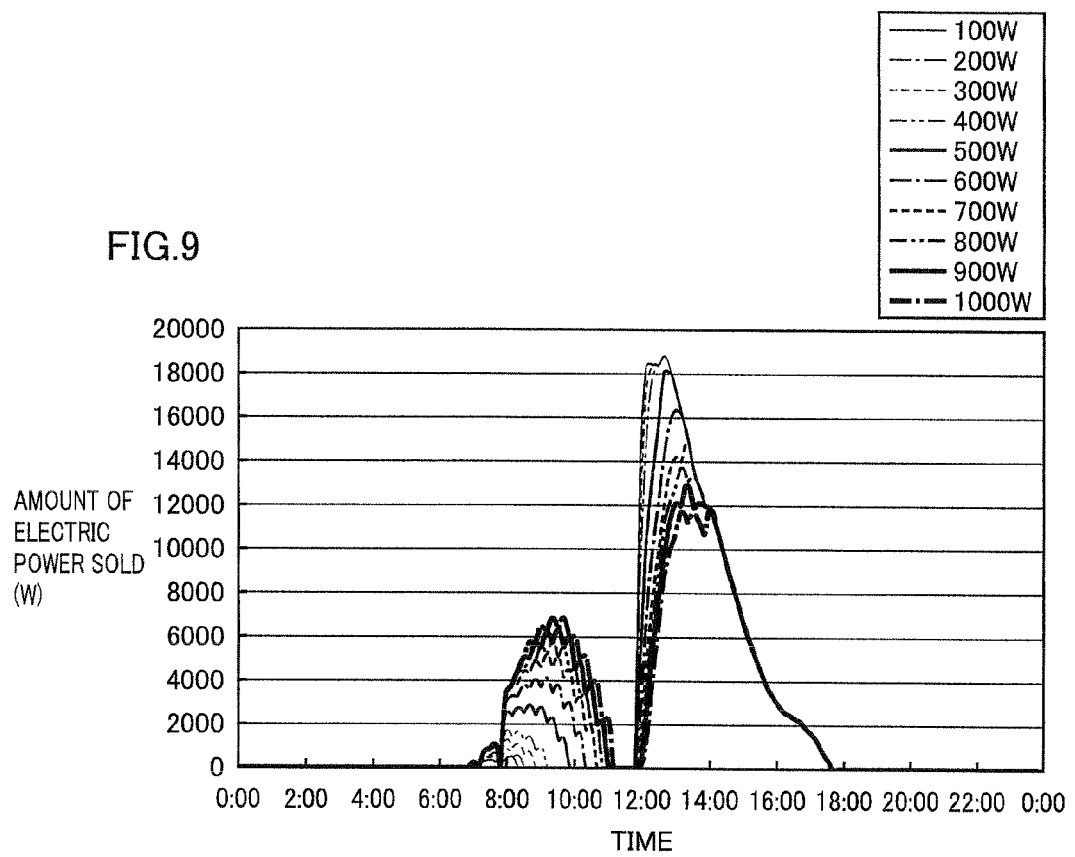
FIG. 9 is a graph showing a change in the amount of electric power sales with respect to each threshold value in the case where the shift time period in accordance with the present embodiment is set at 20 minutes.

FIG. 9 is a graph showing a change in the amount of electric power sales with respect to each threshold value in the case where the shift time period in accordance with the present embodiment is set at 20 minutes. More specifically, FIG. 9 shows the change in the amount of electric power sales in the case where the threshold value is set at 100 W to 1000 W in each of photovoltaic power generators 40A, 40B and 40C.

Referring to FIG. 9, according to the present embodiment, the time period in which power storage is limited, that is, the time period during which electric power sales is given priority, is different house by house. Therefore, the peak of electric power sales becomes lower than the case shown in each of FIGS. 2 and 3. Specifically, in power operation system 100 in accordance with the present embodiment, it is possible to reduce the difference between the amount of electric power sales at pole transformer 65 at night (basically zero) and the amount of electric power sales at pole transformer 65 at around 13:00. In other words, by power operation system 100 in accordance with the present embodiment, the change in the amount of electric power sales by the plurality of photovoltaic power generators can be reduced.

Particularly, when the shift time period is set at 20 minutes, a significant effect can be achieved in the case where the threshold value is set at 500 W or more.

<Study Results 3>

Figure 10:
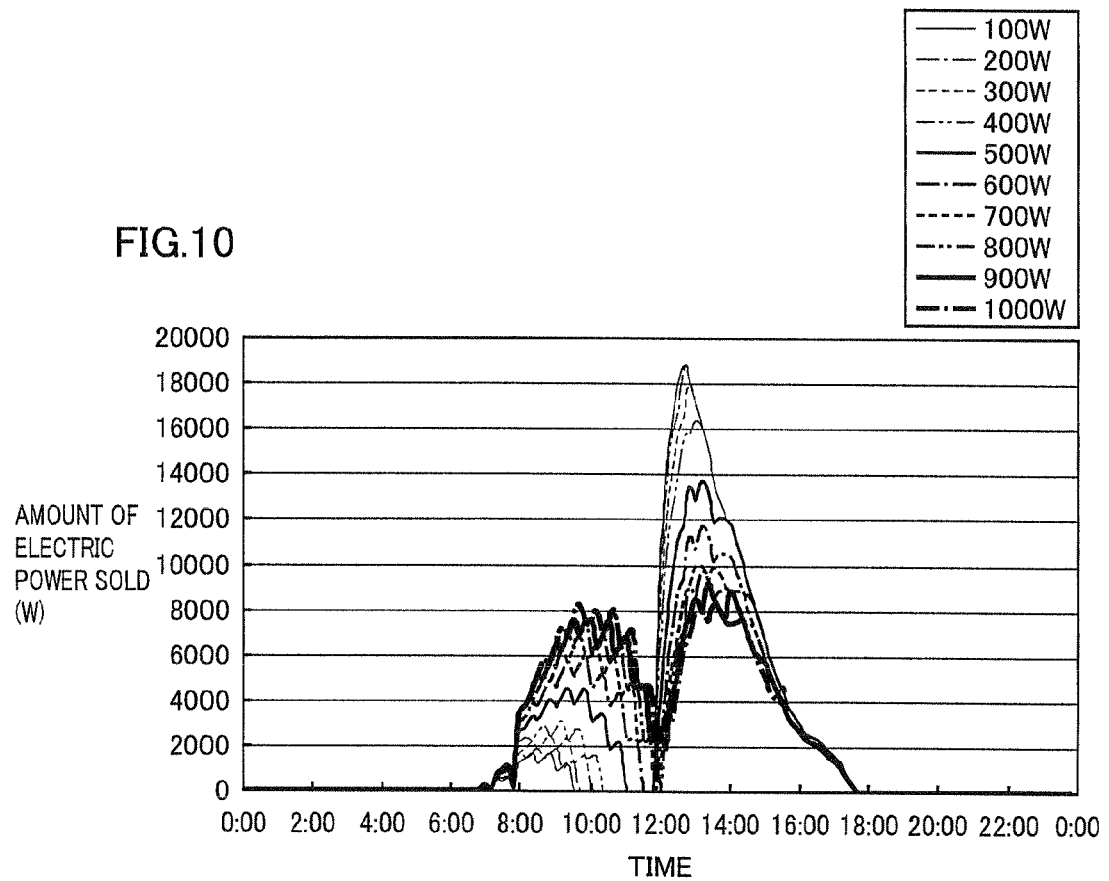
FIG. 10 is a graph showing a change in the amount of electric power sales with respect to each threshold value in the case where the shift time period in accordance with the present embodiment is set at 30 minutes.

FIG. 10 is a graph showing a change in the amount of electric power sales with respect to each threshold value in the case where the shift time period in accordance with the present embodiment is set at 30 minutes. More specifically, FIG. 10 shows the change in the amount of electric power sales in the case where the threshold value is set at 100 W to 1000 W in each of photovoltaic power generators 40A, 40B and 40C.

Referring to FIG. 10, according to the present embodiment, the time period during which power storage is limited, that is, the time period during which electric power sales is given priority, is different house by house. Therefore, the peak of electric power sales becomes lower than the case shown in each of FIGS. 2 and 3. Specifically, in power operation system 100 in accordance with the present embodiment, it is possible to reduce the difference between the amount of electric power sales at pole transformer 65 at night (basically zero) and the amount of electric power sales at pole transformer 65 at around 13:00. In other words, by power operation system 100 in accordance with the present embodiment, the change in the amount of electric power sales by the plurality of photovoltaic power generators can be reduced.

Particularly, when the shift time period is set at 30 minutes, a significant effect can be achieved in the case where the threshold value is set at 300 W or more.

<Study Results 4>

Figure 11:
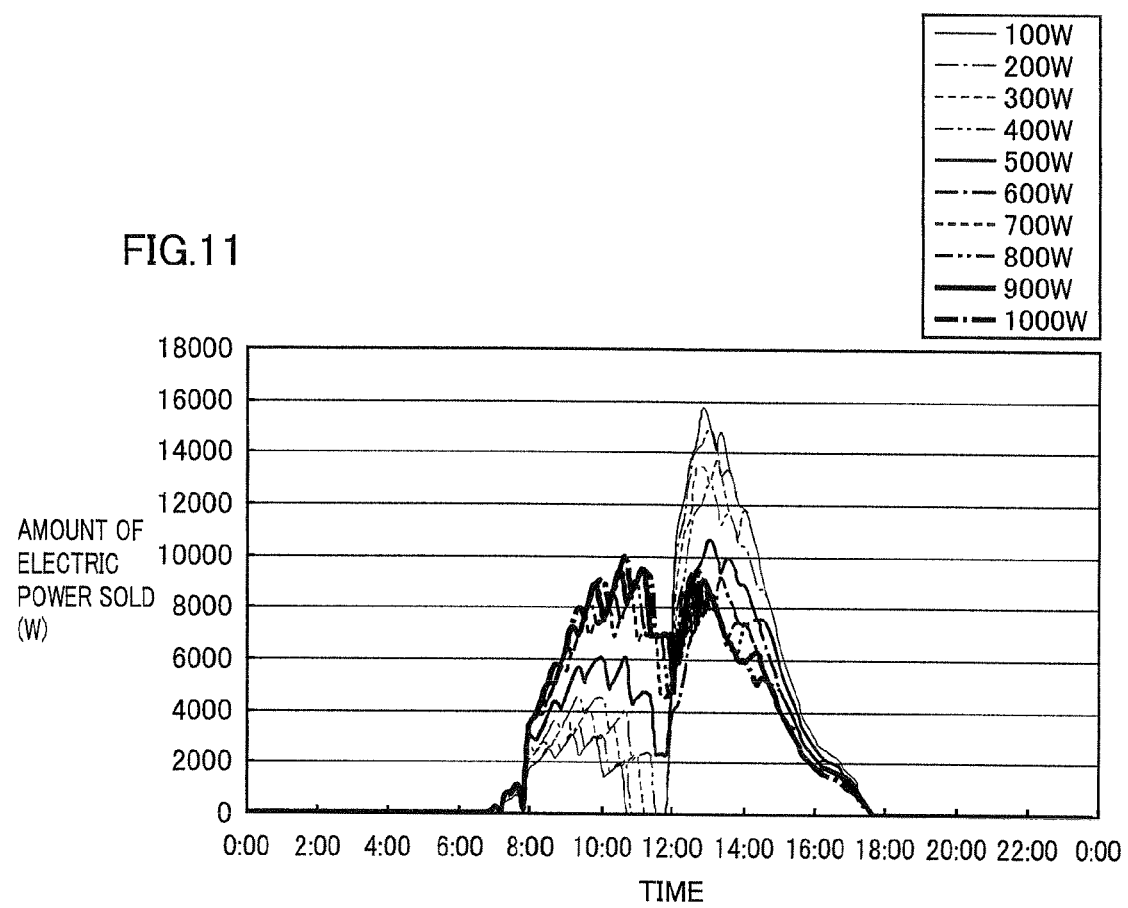
FIG. 11 is a graph showing a change in the amount of electric power sales with respect to each threshold value in the case where the shift time period in accordance with the present embodiment is set at 40 minutes.

FIG. 11 is a graph showing a change in the amount of electric power sales with respect to each threshold value in the case where the shift time period in accordance with the present embodiment is set at 40 minutes. More specifically, FIG. 11 shows the change in the amount of electric power sales in the case where the threshold value is set at 100 W to 1000 W in each of photovoltaic power generators 40A, 40B and 40C.

Referring to FIG. 11, according to the present embodiment, the time period during which power storage is limited, that is, the time period during which electric power sales is given priority, is different house by house. Therefore, the peak of electric power sales becomes lower than the case shown in each of FIGS. 2 and 3. Specifically, in power operation system 100 in accordance with the present embodiment, it is possible to reduce the difference between the amount of electric power sales at pole transformer 65 at night (basically zero) and the amount of electric power sales at pole transformer 65 at around 13:00. In other words, by power operation system 100 in accordance with the present embodiment, the change in the amount of electric power sales by the plurality of photovoltaic power generators can be reduced.

Particularly, when the shift time period is set at 40 minutes, a significant effect can be achieved also in the case where the threshold value is set at 100 W or more.

In light of the foregoing, limitation of power storage may be started when battery control units 20A detects that power generation is started. As shown in FIG. 7, it is preferable that the power storage starting time point of the second photovoltaic power generator is set after the prescribed shift time period (for example, 40 minutes) passed since the power storage starting time point set for the first photovoltaic power generator. Similarly, it is preferable that the power storage starting time point of the third photovoltaic power generator is set after the prescribed shift time period (for example, 40 minutes) passed since the power storage starting time point set for the second photovoltaic power generator.

Furthermore, each of battery control units may limit power storage in the photovoltaic power generator and sell power with priority for a predetermined time period without battery control unit 20A comparing the amount of power generation with the threshold value. Then, as shown in FIG. 7, it is preferable that the power storage starting time point of the second photovoltaic power generator is set after the prescribed shift time period (for example, 40 minutes) passed since the power storage starting time point set for the first photovoltaic power generator. Similarly, it is preferable that the power storage starting time point of the third photovoltaic power generator is set after the prescribed shift time period (for example, 40 minutes) passed since the power storage starting time point set for the second photovoltaic power generator.

<Summary>

In the first embodiment, battery control unit 20A detects the amount of power generation with reference to power conditioner 2A. As shown in FIGS. 4, 8, 9, 10, and 11, when the threshold value is in the range of 100 W to 600 W, it can be found that the prescribed shift time period (shift time) is preferably 20 minutes or more and 30 minutes or less. It is to be noted that the shift time period is set longer than 40 minutes, which may lead to insufficient charging. When the threshold value is 700 W (watts), the prescribed shift time period is set at 20 minutes, which allows the maximum value of the electric power sales to be effectively reduced.

FIG. 12 is a list of the maximum values of the electric power sales for each combination of the threshold value and the shift time period in the case where the threshold value and the output value from power conditioner 2A are compared with each other. FIG. 13 is a list of the maximum values of the electric power sales for each combination of the threshold value and the shift time period in the case where the threshold value and the output value from solar cell 1A are compared with each other.

Referring to FIGS. 12 and 13, in order to achieve more significant effect, it is preferable to set a shift time period during which charging does not become insufficient and also set the largest possible threshold value. The increased length of the shift time period may cause an increase in shortage of charging and also may increase the length of the halt period in the discharged state, thereby shortening the life of the storage battery. In contrast, the decreased shift time period may cause a reduction in the suppressing amount of fluctuation in the amount of electric power sales.

In this manner, in power operation system 100 in accordance with the present embodiment, power storage in photovoltaic power generators 40A, 40B and 40C is limited only when the amount of power generation exceeded a prescribed value. On a cloudy day or on a rainy day, it is highly likely that power storage devices 3A, 3B and 3C of photovoltaic power generators 40A, 40B and 40C are not fully charged, without necessitating electric power sales. Specifically, in power operation system 100 in accordance with the present embodiment, if it is unnecessary to limit power storage, for example, on a day of thin sunshine, power storage is not limited. When power storage devices 3A, 3B and 3C are highly likely to be charged to full capacity, for example, on a day with strong sunshine, power storage in photovoltaic power generators 40A, 40B and 40C is limited for prescribed time periods different from each other.

In the present embodiment, first battery control unit 20A controls second to fourth battery control units 20B, 20C and 20D, to thereby limit power storage in the plurality of photovoltaic power generators. However, the first battery control unit does not need to be uniquely fixed in power operation system 100. In other words, first to fourth battery control units 20A, 20B, 20C, and 20D take turns to act as the first control unit on daily, weekly and monthly bases.

Alternatively, the battery control unit detecting first on that day that the amount of power generation exceeded a prescribed value may act as the first battery control unit.

Furthermore, the following control may be performed as a modification of the flow of the limiting signal shown in FIG. 6. First battery control unit 20A transmits the first limiting signal used for limiting power storage to second battery control unit 20B. In accordance with the first limiting signal, second battery control unit 20B transmits the second limiting signal used for limiting power storage to third battery control unit 20C. In accordance with the second limiting signal, third battery control unit 20C transmits the third limiting signal used for limiting power storage to fourth battery control unit 20D. In accordance with the third limiting signal, fourth battery control unit 20D transmits the fourth limiting signal used for limiting power storage to first battery control unit 20A. In other words, power operation system 100 may transmit the limiting signal sequentially through the battery control units or may cause the limiting signal to be relayed through the battery control units.

[Second Embodiment]

Next, the second embodiment of the present invention will be described. In power operation system 100 in accordance with the first embodiment, the battery control units transmit/receive data to/from each other through communication interfaces. Specifically, the first battery control unit controls the second to fourth battery control units, to limit power storage in the plurality of photovoltaic power generators.

A power operation system 100B in accordance with the present embodiment includes a central control unit separate from the photovoltaic power generators. The central control unit transmits data to battery control units of the photovoltaic power generators through a communication interface. Specifically, the central control unit controls each battery control unit, to limit power storage in the plurality of photovoltaic power generators.

The schematic configuration of power operation system 100B in accordance with the present embodiment is similar to that of power operation system 100 in accordance with the first embodiment and, therefore, description thereof will not be repeated.

<Hardware Configuration of Power Operation System 100B>

Figure 14:
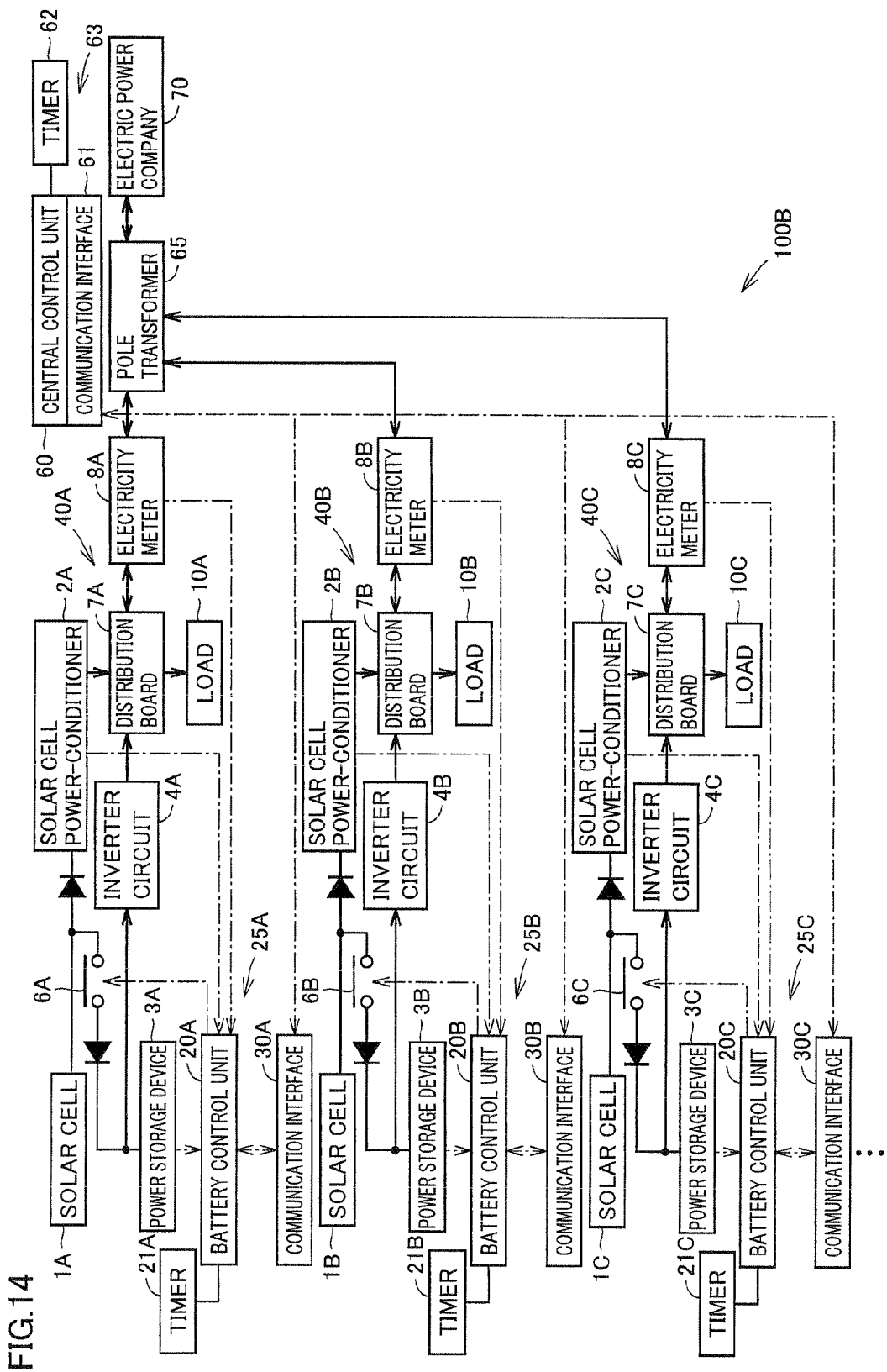
FIG. 14 is a block diagram showing hardware configuration of the power operation system in accordance with the second embodiment.

Next, a specific configuration of power operation system 100B in accordance with the present embodiment will be described. FIG. 14 is a block diagram showing hardware configuration of power operation system 100B in accordance with the present embodiment. In FIG. 14, the flow of electric energy (electric power) is represented by solid arrows, and the flow of information (signals) such as numerical values and instructions is represented by dotted arrows.

Referring to FIG. 14, power operation system 100B in accordance with the present embodiment is different from power operation system 100 in accordance with the first embodiment in that it includes a central controller 63. Central controller 63 includes a central control unit 60, a communication interface 61, and a timer 62. Except for this point, the configuration of power operation system 100B is the same as that of power operation system 100 in accordance with the first embodiment and, therefore, description will not be repeated here. It is noted, however, that in power operation system 100B in accordance with the present embodiment, battery control units 20A to 20D may not be capable of direct communication with each other.

Central control unit 60 is implemented, for example, by a CPU and a control program executed by the CPU. More specifically, the CPU reads a control program stored in a memory which is not shown, and executes the program, thereby implementing central control unit 60.

Central control unit 60 obtains the amounts of electric power stored in power storage devices 3A, 3B and 3C of photovoltaic power generators 40A, 40B and 40C, and the amounts of power at distribution boards 7A, 7B and 7C and electricity meters 8A, 8B and 8C, from battery control units 20A, 20B and 20C of photovoltaic power generators 40A, 40B and 40C, through communication interface 61. With reference to timer 62, central control unit 60 causes battery control units 20A, 20B and 20C of photovoltaic power generators 40A, 40B and 40C to open/close switches 6A, 6B and 6C, through communication interface 61. Specifically, central control unit 60 limits power storage by battery control units 20A, 20B and 20C through communication interface 61.

Each of battery control units 20A, 20B and 20C in accordance with the present embodiment limits power storage in a prescribed time period based on a limiting signal from central control unit 60, with reference to timers 21A, 21B and 21C. By way of example, based on the limiting signal from central control unit 60, battery control units 20A, 20B and 20C in accordance with the present embodiment turn OFF switches 6A, 6B and 6C for prescribed time periods.

In the present embodiment, power conditioners 2A, 2B and 2C as detecting units detect output values of power generated by solar cells 1A, 1B and 1C, and transmit the output values to battery control units 20A, 20B and 20C. It is noted, however, that solar cells 1A, 1B and 1C or battery control units 20A, 20B and 20C (if provided with a detecting unit as one of their functions) or other device may serve as detecting units to directly detect the output values of electric power generated by solar cells 1A, 1B and 1C, and thus, battery control units 20A, 20B and 20C may obtain the output values. In the present embodiment, battery control units 20A, 20B and 20C transmit the output values to central control unit 60 through communication interfaces 30A, 30B and 30C. Central control unit 60 determines whether or not each of solar cells 1A, 1B and 1C is generating power, based on the output values.

Alternatively, power conditioners 2A, 2B and 2C serving as detecting units, solar cells 1A, 1B and 1C or other device may determine whether or not solar cells 1A, 1B and 1C are generating power, based on the power output values. Alternatively, battery control units 20A, 20B and 20C may determine whether or not solar cells 1A, 1B and 1C are generating power, based on the output values. In that case, battery control units 20A, 20B and 20C periodically transmit information representing whether or not solar cells 1A, 1B and 1C are generating power (or information representing that solar cells 1A, 1B and 1C started power generation) to central control unit 60 through communication interfaces 30A, 30B and 30C.

It is noted that power conditioners 2A, 2B and 2C, solar cells 1A, 1B and 1C, battery control units 20A, 20B and 20C or other device can obtain at least one of output voltage (V), output current (A) and output power (W) at opposite ends of solar cells 1A, 1B and 1C as the output values of solar cells 1A, 1B and 1C. By way of example, power conditioners 2A, 2B and 2C, battery control units 20A, 20B and 20C or other device may obtain, as the output values of solar cells 1A, 1B and 1C, the output power (W) at opposite ends of solar cells 1A, 1B and 1C minus the power (W) consumed by photovoltaic power generators 40A, 40B and 40C by themselves.

In the present embodiment, each of battery control units 20A, 20B and 20C and central control unit 60 or each of communication interfaces 30A, 30B, 30C, and 61 is assigned an ID (address). Each of battery control units 20A, 20B and 20C and central control unit 60 transmits a signal (data) based on the ID of the destination.

<Outline of Operation of Power Operation System 100B>

Next, an outline of the operation of power operation system 100B in accordance with the present embodiment will be described. FIG. 15 shows control sequence by battery control units 20A, 20B, 20C and 20D in power operation system 100B in accordance with the present embodiment.

Referring to FIG. 15, solar cell 1A of photovoltaic power generator 40A (first photovoltaic power generator) of house 50A (first house) starts power generation (step S202). Solar cell 1B of photovoltaic power generator 40B (second photovoltaic power generator) of house 50B (second house) starts power generation (step S204). Solar cell 1C of photovoltaic power generator 40C (third photovoltaic power generator) of house 50C (third house) starts power generation (step S206). The solar cell of a photovoltaic power generator (fourth photovoltaic power generator) of a house (fourth house) starts power generation (step S208).

Battery control unit 20A turns ON switch 6A, so as to start charging power storage device 3A with the excessive power (step S210). More specifically, battery control unit 20A starts to store the excessive power not used by load 10A in power storage device 3A, based on a signal from distribution board 7A or a signal from electricity meter 8A. In the present embodiment, battery control unit 20A detects that power storage device 3A started power storage, based on a power generation signal from power conditioner 2A.

Battery control unit 20B turns ON switch 6B, to start charging of power storage device 3B with the excessive power (step S212). Battery control unit 20B detects the start of power storage. Battery control unit 20C turns ON switch 6C, to start charging of power storage device 3C with the excessive power (step S214). Battery control unit 20C detects the start of power storage. Battery control unit 20D turns ON a switch, to start charging of a power storage device with the excessive power (step S216). Battery control unit 20D detects the start of power storage.

Central control unit 60 obtains the amount of power generation from each photovoltaic power generator, through communication interface 61 (step S218). More specifically, battery control unit 20A detects the amount of power generated by solar cell 1A directly or with reference to power conditioner 2A and the like. Battery control unit 20A transmits the amount of power generated by solar cell 1A to central control unit 60 through communication interface 30A (step S220).

Battery control unit 20B transmits the amount of power generated by solar cell 1B to central control unit 60 through communication interface 30B (step S222). Battery control unit 20C transmits the amount of power generated by solar cell 1C to central control unit 60 through communication interface 30C (step S224). Battery control unit 20D transmits the amount of power generated by the solar cell to central control unit 60 through a communication interface (step S226).

Central control unit 60 determines whether or not the sum of the amounts of power generated by the first to fourth photovoltaic power generators exceeded a prescribed value, by obtaining the amounts of power generated by the first to fourth photovoltaic power generators using communication interface 61 (step S228). It is noted that central control unit 60 may determine whether or not the predetermined amount of power generated by solar cell 1A exceeded a prescribed value (threshold value) using communication interface 30A. Alternatively, central control unit 60 may determine whether or not the amount of power generated by any of solar cells 1A, 1B and 1C exceeded a prescribed value (threshold value) using communication interface 30A.

If the total amount of generated power does not exceed the prescribed value (NO at step S228), central control unit 60 repeats the process steps from step S218. If central control unit 60 determines that the total amount of generated power exceeded the prescribed value (YES at step S228), central control unit 60 calculates the power storage limiting time period in each photovoltaic power generator (step S230).

The power storage limiting time period in each photovoltaic power generator corresponds to the time period during which electric power sales is given priority over power storage in the photovoltaic power generator. It is to be noted that the length of the power storage limiting time period may be set in advance based on the number of photovoltaic power generators connected to pole transformer 65.

For example, central control unit 60 determines, as a power storage limiting time period of the first photovoltaic power generator, the prescribed time period from the time point at which the amount of power generation exceeded the threshold value. Central control unit 60 determines, as a power storage limiting time period of the second photovoltaic power generator, the prescribed time period from the time point after a prescribed shift time period has passed from the time point at which the amount of power generation exceeded a threshold value. Central control unit 60 determines, as a power storage limiting time period of the third photovoltaic power generator, the prescribed time period from the time point after twice the prescribed shift time period has passed from the time point at which the amount of power generation exceeded a threshold value. Central control unit 60 determines, as a power storage limiting time period of the fourth photovoltaic power generator, the prescribed time period from the time point after three times the prescribed shift time period has passed from the time point at which the amount of power generation exceeded a threshold value.

Central control unit 60 transmits the power storage limiting time period for limiting power storage to battery control units 20A, 20B, 20C and 20D, using communication interface 61 (step S232). Central control unit 60 issues a signal to battery control units 20A, 20B, 20C and 20D in a smaller unit of time (10-minute intervals), and each of battery control units 20A, 20B, 20C and 20D may limit power storage based on the signal.

More specifically, central control unit 60 transmits the power storage limiting time point (for example, started 10 minutes later, 20 minutes later and the like) at which power storage should be limited in respective battery control units 20A, 20B, 20C and 20D, to battery control units 20A, 20B, 20C and 20D, based on the present time point. Alternatively, central control unit 60 may transmit the time length (for example, 1 hour, 2 hours) in which power storage should be limited in respective battery control units 20A, 20B, 20C and 20D, to battery control units 20A, 20B, 20C and 20D, when the time point comes from which battery control units 20A, 20B, 20C and 20D should start limiting power storage.

Battery control unit 20A receives the limiting signal from central control unit 60 through communication interface 30A (step S234). Battery control unit 20B receives the limiting signal from central control unit 60 through communication interface 30B (step S236). Battery control unit 20C receives the limiting signal from central control unit 60 through communication interface 30C (step S238). Battery control unit 20D receives the limiting signal from central control unit 60 through a communication interface (step S240).

Based on the received limiting signal, battery control unit 20A turns OFF switch 6A, whereby power storage is stopped for the prescribed time period, and electric power sales is given priority (step S242). At this time, battery control unit 20B maintains switch 6B ON and stores power with priority for the prescribed shift time period, based on the limiting signal. Based on the limiting signal, battery control unit 20C maintains switch 6C ON for twice the prescribed shift time period, and stores power with priority. Based on the limiting signal, battery control unit 20D maintains the switch ON for three times the prescribed shift time period, and stores power with priority.

When the prescribed shift time period passed, battery control unit 20B turns OFF switch 6B, to stop power storage for the prescribed time period and sell power with priority (step S244). Then, the prescribed shift time period further passed, battery control unit 20C turns OFF switch 6C, to stop power storage for the prescribed time period and sell power with priority (step S246). Then, the prescribed shift time period further passed, battery control unit 20D turns OFF the switch, to stop power storage for the prescribed time period and sell power with priority (step S248).

When the prescribed time period from step S242 passed or ends, battery control unit 20A turns ON switch 6A, to start power storage (step S250). When the prescribed time period from step S244 passed, battery control unit 20B turns ON switch 6B, to start power storage (step S252). When the prescribed time period from step S246 passed, battery control unit 20C turns ON the switch, to start power storage (step S254). When the prescribed shift time period from step S248 further passed, battery control unit 20D turns ON the switch, to start power storage (step S256).

In this manner, in power operation system 100B in accordance with the present embodiment, power storage in each of photovoltaic power generators 40A, 40B and 40C is limited only when the amount of power generation exceeded a prescribed value. On a cloudy day or on a rainy day, it is highly likely that power storage devices 3A, 3B and 3C of photovoltaic power generators 40A, 40B and 40C are not fully charged, without necessitating electric power sales. Specifically, in power operation system 100B in accordance with the present embodiment, if it is unnecessary to limit power storage, for example, on a day of thin sunshine, power storage is not limited. When power storage devices 3A, 3B and 3C are highly likely to be charged to full capacity, for example, on a day with strong sunshine, power storage in photovoltaic power generators 40A, 40B and 40C is limited for prescribed time periods different from each other.

Power operation system 100B in accordance with the present embodiment is different from power operation system 100 in accordance with the first embodiment depending on whether the location of the function for controlling power storage and electric power sales in each photovoltaic power generator is provided inside or outside of the photovoltaic power generator. Accordingly, power operation system 100B in accordance with the present embodiment also allows reduction in fluctuation of the amount of electric power sales by setting the prescribed threshold value and the shift time period as shown in FIGS. 4, 8, 9, 10, 11, 12, and 13.

<Other Embodiments>

The present invention may also be realized by providing a system or a device with a program. When a storage medium storing a program represented by software implementing the present invention is loaded to a system or a device, and a computer of the system or the device (or a CPU or a MPU) reads and executes the program codes stored in the storage medium, the effects of the present invention can also be enjoyed.

In such a case, the program codes themselves read from the storage medium realize the function of the embodiments described above, and the storage medium storing the program codes implements the present invention.

Examples of the storage medium for supplying the program codes include a hard disk, an optical disk, a magneto-optical disk, a CD-ROM, a CD-R, a magnetic tape, a non-volatile memory card (IC memory card), an ROM (mask ROM, flash EEPROM), and the like.

The present invention encompasses cases when the program codes read by the computer are executed and the functions of the above-described embodiments are realized, and when part of or all of actual processing is done by an OS (Operating System) or the like running on the computer based on the instructions of the program codes and thereby the functions of the above-described embodiments are realized.

Further, the present invention also encompasses a case when program codes read from the storage medium are written to a memory provided in a function enhancement unit connected to a computer or a function enhancement board inserted to a computer, part of or all of actual processing is done by a CPU or the like provided on the function enhancement unit or the function enhancement board based on the instructions of the program codes and the functions of the above-described embodiments are realized.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power operation system comprising:
a plurality of photovoltaic power generators connected to an electric power system through one same receiving end and installed in different houses, respectively,
each of said plurality of photovoltaic power generators including
a solar cell receiving sunlight and outputting electric power,
a storage battery for storing said electric power,
a communication interface for communication with another photovoltaic power generator, and
a battery control unit for controlling storage of said electric power and output of said electric power to said electric power system,
at least one of a plurality of said battery control units causing a first photovoltaic power generator included in said plurality of photovoltaic power generators to prioritize output of said electric power to said electric power system over storage of said electric power during a first time period, and causing a second photovoltaic power generator included in said plurality of photovoltaic power generators to prioritize output of said electric power to said electric power system over storage of said electric power during a second time period delayed by a prescribed time period from said first time period.

2. A power operation system comprising:
a plurality of photovoltaic power generators connected to an electric power system through one same receiving end and installed in different houses, respectively,
each of said plurality of photovoltaic power generators including
a solar cell receiving sunlight and outputting electric power,
a storage battery for storing said electric power, and
a battery control unit for controlling storage of said electric power and output of said electric power to said electric power system,
said power operation system further comprising:
a central control unit for causing a first photovoltaic power generator included in said plurality of photovoltaic power generators to prioritize output of said electric power to said electric power system over storage of said electric power during a first time period, and causing a second photovoltaic power generator included in said plurality of photovoltaic power generators to prioritize output of said electric power to said electric power system over storage of said electric power during a second time period delayed by a prescribed time period from said first time period.

3. A power operation method using a plurality of photovoltaic power generators connected to an electric power system through one same receiving end and installed in different houses, respectively,
each of said plurality of photovoltaic power generators including
a solar cell receiving sunlight and outputting electric power,
a storage battery for storing said electric power,
a communication interface for communication with another photovoltaic power generator, and
a battery control unit for controlling storage of said electric power and output of said electric power to said electric power system,
said power operation method comprising:
at least one of the plurality of said battery control units causing a first photovoltaic power generator included in said plurality of photovoltaic power generators to prioritize output of said electric power to said electric power system over storage of said electric power during a first time period; and
said at least one of a plurality of said battery control units causing a second photovoltaic power generator included in said plurality of photovoltaic power generators to prioritize output of said electric power to said electric power system over storage of said electric power during a second time period delayed by a prescribed time period from said first time period.

4. The power operation method according to claim 3, wherein
at least one of said plurality of photovoltaic power generators further includes a detecting unit detecting an output value of electric power from said solar cell, and
said power operation method comprising:
said at least one of a plurality of said battery control units determining whether or not said output value reached a prescribed value, using said detecting unit, and determining said first and second time periods based on a time point when said output value reached said prescribed value, or
said at least one of a plurality of said battery control units determining whether or not said solar cell output electric power, using said detecting unit, and determining said first and second time periods based on a time point when said solar cell started to output the electric power.

5. A power operation method using a plurality of photovoltaic power generators connected to an electric power system through one same receiving end and installed in different houses, respectively, and a central control unit,
each of said plurality of photovoltaic power generators including
a solar cell receiving sunlight and outputting electric power,
a storage battery for storing said electric power, and
a battery control unit for controlling storage of said electric power and output of said electric power to said electric power system,
said power operation method comprising:
said central control unit causing a first photovoltaic power generator included in said plurality of photovoltaic power generators to prioritize output of said electric power to said electric power system over storage of said electric power during a first time period; and
said central control unit causing a second photovoltaic power generator included in said plurality of photovoltaic power generators to prioritize output of said electric power to said electric power system over storage of said electric power during a second time period delayed by a prescribed time period from said first time period.

6. The power operation method according to claim 5, wherein
at least one of said plurality of photovoltaic power generators further includes a detecting unit detecting an output value of electric power from said solar cell, and
said power operation method comprising:
said central control unit determining whether or not said output value reached a prescribed value, using said detecting unit, and determining said first and second time periods based on a time point when said output value reached said prescribed value, or
said central control unit determining whether or not said solar cell output electric power, using said detecting unit, and determining said first and second time periods based on a time point when said solar cell started to output the electric power.

7. A photovoltaic power generator comprising:
a solar cell receiving sunlight and outputting electric power;
a storage battery for storing said electric power;
a communication interface for communication with another photovoltaic power generator connected to an electric power system through one same receiving end; and
a battery control unit for controlling storage of said electric power and output of said electric power to said electric power system,
said photovoltaic power generator and said another photovoltaic power generator are installed in different houses, respectively, and
said battery control unit causing said photovoltaic power generator to prioritize output of said electric power to said electric power system over storage of said electric power during a first time period, and causing at least one said another photovoltaic power generator to prioritize output of said electric power to said electric power system over storage of said electric power during a second time period delayed by a prescribed time period from said first time period, through said communication interface.

8. The photovoltaic power generator according to claim 7, further comprising:
a detecting unit detecting an output value of electric power from said solar cell,
said battery control unit determining whether or not said output value reached a prescribed value, using said detecting unit, and determining said first and second time periods based on a time point when said output value reached said prescribed value, or
determining whether or not said solar cell output electric power, using said detecting unit, and determining said first and second time periods based on a time point when said solar cell started to output the electric power.

9. A power operation system comprising:
a plurality of photovoltaic power generators connected to an electric power system through one same receiving end,
each of said plurality of photovoltaic power generators including
a solar cell receiving sunlight and outputting electric power,
a storage battery for storing said electric power,
a communication interface for communication with another photovoltaic power generator, and
a battery control unit for controlling storage of said electric power and output of said electric power to said electric power system,
at least one of said plurality of photovoltaic power generators further including a detecting unit detecting an output value of electric power from said solar cell, and
at least one of a plurality of said battery control units causing a first photovoltaic power generator included in said plurality of photovoltaic power generators to prioritize output of said electric power to said electric power system over storage of said electric power during a first time period, and causing a second photovoltaic power generator included in said plurality of photovoltaic power generators to prioritize output of said electric power to said electric power system over storage of said electric power during a second time period delayed by a prescribed time period from said first time period, and
determining whether or not said output value reached a prescribed value, using said detecting unit, and determining said first and second time periods based on a time point when said output value reached said prescribed value, or
determining whether or not said solar cell output electric power, using said detecting unit, and determining said first and second time periods based on a time point when said solar cell started to output the electric power.

10. A power operation system comprising:
a plurality of photovoltaic power generators connected to an electric power system through one same receiving end,
each of said plurality of photovoltaic power generators including
a solar cell receiving sunlight and outputting electric power,
a storage battery for storing said electric power, and
a battery control unit for controlling storage of said electric power and output of said electric power to said electric power system,
at least one of said plurality of photovoltaic power generators further including a detecting unit detecting an output value of electric power from said solar cell, and
said power operation system further comprising:
a central control unit for causing a first photovoltaic power generator included in said plurality of photovoltaic power generators to prioritize output of said electric power to said electric power system over storage of said electric power during a first time period, and causing a second photovoltaic power generator included in said plurality of photovoltaic power generators to prioritize output of said electric power to said electric power system over storage of said electric power during a second time period delayed by a prescribed time period from said first time period,
said central control unit determining whether or not said output value reached a prescribed value, using said detecting unit, and determining said first and second time periods based on a time point when said output value reached said prescribed value, or
determining whether or not said solar cell output electric power, using said detecting unit, and determining said first and second time periods based on a time point when said solar cell started to output the electric power.

* * * * *